US012709684B2

(12) United States Patent
Bartnik Johansson et al.

(10) Patent No.: US 12,709,684 B2
(45) Date of Patent: Aug. 18, 2026

(54) HIGH TEMPERATURE LOW EMITTING MINERAL WOOL PRODUCT

(71) Applicant: ROCKWOOL A/S, Hedehusene (DK)

(72) Inventors: Dorte Bartnik Johansson, Roskilde (DK); Miroslav Nikolic, Aarhus (DK); Rikke Mattsson, Hedehusene (DK)

(73) Assignee: ROCKWOOL A/S, Hedehusene (DK)

( * ) Notice: Subject to any disclaimer, the term of this patent is extended or adjusted under 35 U.S.C. 154(b) by 816 days.

(21) Appl. No.: 17/995,103

(22) PCT Filed: Apr. 1, 2021

(86) PCT No.: PCT/EP2021/058725

§ 371 (c)(1),
(2) Date: Sep. 29, 2022

(87) PCT Pub. No.: WO2021/198474

PCT Pub. Date: Oct. 7, 2021

(65) Prior Publication Data

US 2023/0174783 A1 Jun. 8, 2023

(30) Foreign Application Priority Data

Apr. 3, 2020 (WO) ................ PCT/EP2020/059660

(51) Int. Cl.
*C08L 97/00* (2006.01)
*C08K 7/04* (2006.01)

(52) U.S. Cl.
CPC .............. *C08L 97/005* (2013.01); *C08K 7/04* (2013.01); *C08L 2312/00* (2013.01)

(58) Field of Classification Search
None
See application file for complete search history.

(56) References Cited

U.S. PATENT DOCUMENTS 3,093,604 A * 6/1963 Ayers ...................... C08L 61/00 156/335
5,318,990 A 6/1994 Straus
5,661,213 A 8/1997 Arkens et al.
6,706,853 B1 3/2004 Stanssens et al.
6,730,730 B1 5/2004 Hansen et al.
6,818,699 B2 11/2004 Kajimaru et al.
8,864,893 B2 * 10/2014 Hawkins ................. C08K 3/32 106/206.1
2002/0091185 A1 7/2002 Taylor et al.
2003/0042344 A1 3/2003 Fisch et al.
2003/0153690 A1 8/2003 Husemoen et al.
2004/0024170 A1 2/2004 Husemoen
2006/0111480 A1 5/2006 Hansen et al.
2007/0006390 A1 1/2007 Clamen et al.
2007/0173588 A1 7/2007 Espiard
2009/0227706 A1 9/2009 Hansen et al.
2010/0012879 A1 1/2010 Nissen
2018/0002225 A1 * 1/2018 Allais ...................... C08K 5/54
2018/0009708 A1 1/2018 Allais et al.
2019/0338168 A1 11/2019 Laine et al.
2022/0106508 A1 4/2022 Johansson et al.

FOREIGN PATENT DOCUMENTS

CN 113015711 A1 6/2021
EP 583086 A1 2/1994
EP 990727 A1 4/2004
EP 1741726 A1 1/2007
EP 3632866 A1 4/2020
FR 2976584 A1 12/2012
WO 9936368 A1 7/1999
WO 0105725 A1 1/2001
WO 0196460 A2 12/2001
WO 0206178 A1 1/2002
WO 2004007615 A1 1/2004
WO 2006061249 A1 6/2006
WO 2008023032 A1 2/2008
WO 2012172262 A1 12/2012
WO 2016120575 A1 8/2016
WO 2016120576 A1 8/2016

OTHER PUBLICATIONS

Adriani et al Oxidative Carboxylation of Lignin: Exploring Reactivity of Different Lignin Types (Year: 2024).*
Ammoxidized Fenton Activated Pine Kraft Lignin Accelerates Synthesis and Curing of Resole Resins, Masoumeh Ghorbani et al., Polymers, vol. 9, p. 1-17.
U.S. Appl. No. 17/995,102, filed Sep. 29, 2022.
U.S. Appl. No. 17/995,104, filed Sep. 29, 2022.
U.S. Appl. No. 17/995,106, filed Sep. 29, 2022.
U.S. Appl. No. 17/995,107, filed Sep. 29, 2022.
Kuehnel, "Comparison of different cyclic organic carbonates in the oxyalkylation of various types of lignin", Reactive and Functional Polymers 120 (2017) pp. 83-91.
Giummarella, "Fractional profiling of kraft lignin structure: Unravelling insights on lignin reaction mechanisms", ACS Sustainable Chemistry & Engineering, Dec. 16, 2019.
Constant, "New insights into the structure and composition of technical lignins: a comparative characterization study", Green Chemistry, 2016, 18, 251.
More, "A review of lignin hydrogen peroxide oxidation chemistry with emphasis on aromatic aldehydes and acids," De Gruyter, Holzforschung 2021; aop.
Rahimi, "Chemoselective Metal-Free Aerobic Alcohol Oxidation in Lignin," Journal of the American Chemical Society, 2013, pp. 6415-6418.

* cited by examiner

*Primary Examiner* — Katarzyna I Kolb
(74) *Attorney, Agent, or Firm* — Abel Schillinger, LLP

(57) ABSTRACT

The present invention is directed to a high temperature low emitting mineral fiber product which is suitable as thermal insulation.

19 Claims, 4 Drawing Sheets

Lignin precursors p-coumaryl coniferyl sinapyl

P-hydroxyphenyl (H)

guaiacyl (S)

syringyl (S)

Common interunit linkages

Properties of technical lignins

| Lignin Type | Sulfur Lignins | | Sulfur-free lignins | |
|---|---|---|---|---|
| | Kraft | Lignosulfate | Soda | Organosolv |
| Raw materials | Softwood<br>Hardwood | Softwood<br>Hardwood | Annual plants | Softwood<br>Hardwood<br>Annual Plants |
| Solubility | Alkali<br>Organic solvents | Water | Alkali | Wide range of organic solvents |
| Number-average molar mass ($M_a$-gmol$^{-1}$) | 1000-3000 | 15,000-50,000 | 800-3000 | 500-5000 |
| Polydispersity | 2.5-3.5 | 6-8 | 2.5-3.5 | 1.5-2.5 |
| $T_g$(°C) | 140-150 | 130 | 140 | 90-110 |

HIGH TEMPERATURE LOW EMITTING MINERAL WOOL PRODUCT

FIELD OF THE INVENTION

The present invention relates to a mineral fibre product, and a use of a mineral fibre product.

BACKGROUND OF THE INVENTION

Mineral fibre products (also termed mineral wool products) generally comprise mineral fibres (also termed as man-made vitreous fibres (MMVF)) such as, e.g., glass fibres, ceramic fibres, basalt fibres, slag fibres, and stone fibres (rock fibres), which are bonded together by a cured thermoset polymeric binder material. For use as thermal or acoustical insulation products, bonded mineral fibre mats are generally produced by converting a melt made of suitable raw materials to fibres in conventional manner, for instance by a spinning cup process or by a cascade rotor process. The fibres are blown into a forming chamber and, while airborne and while still hot, are sprayed with a binder solution and randomly deposited as a mat or web onto a travelling conveyor. The fibre mat is then transferred to a curing oven where heated air is blown through the mat to cure the binder and rigidly bond the mineral fibres together.

In the past, the binder resins of choice have been phenol-formaldehyde resins which can be economically produced and can be extended with urea prior to use as a binder. However, the existing and proposed legislation directed to the lowering or elimination of formaldehyde emissions have led to the development of formaldehyde-free binders such as, for instance, the binder compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol-formaldehyde binders are the addition/-elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties in terms of curing speed and curing density. WO 2008/023032 discloses urea-modified binders of that type which provide mineral wool products having reduced moisture take-up.

Since some of the starting materials used in the production of these binders are rather expensive chemicals, there is an ongoing need to provide formaldehyde-free binders which are economically produced.

A further effect in connection with previously known aqueous binder compositions from mineral fibres is that at least the majority of the starting materials used for the productions of these binders stem from fossil fuels. There is an ongoing trend of consumers to prefer products that are fully or at least partly produced from renewable materials and there is therefore a need to provide binders for mineral wool which are, at least partly, produced from renewable materials.

In high temperature applications, the mineral fibre product may off-gas organic constituents derived from the binder when being used at such high temperatures, especially when used for the first time at such temperatures and/or when used during brief time intervals at such temperatures. High temperature application is e.g. when the mineral fibre product is used as thermal insulation of pipes and equipment in power plants, wherein temperatures of 400° C. to 500° C. are not unusual. Another high temperature application is the use of the mineral fibre product as thermal insulation of furnaces, wherein the product may be used up to its maximum service temperature of e.g. 600° C. or 650° C. or even 700° C.

A particular problem in this regard is emission of harmful isocyanic acid (ICA) from mineral fibre products, in particular products containing urea extended phenolic resin or other resins or binders containing urea. Addition of urea or other nitrogen containing compounds is a conventional way of achieving better fire performance and thermal stability at high temperatures in mineral wool products.

The chemical formula of isocyanic acid is HNCO. A significant part of the ICA emission of mineral fibre products can be based on the use of urea or derivatives of urea in the binder composition. The emission of ICA can lead to health issues and there is existing and proposed legislation directed to the lowering or elimination of ICA emissions coming from mineral fiber products during installation and usage but also from the production of the mineral fiber products.

Other chemical components of interest from thermal emission could be hydrogen cyanide (HCN), ammonia ($NH_3$) and NOx but also other nitrous containing species.

The invention will be described in the following by two alternatives, namely Alternative A and Alternative B

Alternative A (First to Forth Aspect of the Invention)

SUMMARY OF THE INVENTION

Accordingly, it was an object of the present invention to provide a mineral fibre product which has improved high temperature use, is economically produced and is using renewable materials as starting products for the preparation of the aqueous binder composition.

A further object of the present invention was to provide a use of such mineral fibre product.

A further object of the present invention was to provide a method of transporting a medium through a pipe at high temperatures.

In accordance with a first aspect of the present invention, there is provided a mineral fibre product, comprising mineral fibres bound by a cured binder composition, the non-cured binder composition comprising one or more oxidized lignins, wherein heating of the mineral fibre product to a temperature of 600° C. off-gases less than 1500 ppm isocyanic acid (ICA) per gram solid content per second.

In accordance with a second aspect of the present invention, there is provided a use of a mineral fibre product, comprising mineral fibres bound by a cured binder composition, the non-cured binder composition comprising one or more oxidized lignins, at a temperature of at least 300° C., preferably as a thermal insulation product, wherein optionally heating of the mineral fibre product to a temperature of 600° C. off-gases less than 1500 ppm isocyanic acid (ICA) per gram solid content per second.

In accordance with a third aspect of the present invention, there is provided a method for transporting a medium, comprising the steps of a) covering a pipe with a mineral fibre product as a thermal pipe insulation, and
b) transporting the medium through the pipe, wherein the mineral fibre product comprises mineral fibres bound by a cured binder composition, the non-cured binder composition comprising one or more oxidized lignins, as a thermal pipe insulation, wherein optionally heating of the mineral fibre product to a temperature of 600° C. off-gases less than 1500 ppm isocyanic acid (ICA) per gram solid content per second.

In accordance with a forth aspect of the present invention, there is provided a pipe covered with a mineral fibre product as a thermal insulation, wherein the mineral fibre product comprises mineral fibres bound by a cured binder composition, the non-cured binder composition comprising one or more oxidized lignins, wherein optionally heating of the mineral fibre product to a temperature of 600° C. off-gases less than 1500 ppm isocyanic acid (ICA) per gram solid content per second.

The present inventors have surprisingly found that it is possible to use a mineral fibre product in high temperature applications with low ICA emissions or even without ICA emissions, when a binder composition based on oxidized lignin is used for the mineral fibre product.

DESCRIPTION OF THE PREFERRED EMBODIMENTS

The mineral fibre product of the invention comprises mineral fibres bound by a cured binder composition, the non-cured binder composition comprising one or more oxidized lignins, wherein heating of the mineral fibre product to a temperature of 600° C. off-gases less than 1500 ppm isocyanic acid (ICA) per gram solid content per second, preferably less than 1000 ppm isocyanic acid (ICA) per gram solid content per second, more preferably less than 750 ppm isocyanic acid (ICA) per gram solid content per second.

The mineral fibre product heated comprises the cured binder composition. With respect to "gram solid content" the solid content (LOI) refers to the quantity of organic material (loss of ignition) in the mineral fiber product. This solid content generally refers to the cured binder composition and optionally hydrophobic agents and/or impregnating oils contained in the mineral fiber product.

When a mineral fibre product which comprises the cured binder composition is subjected to heating at a certain temperature and the off-gases are quantitatively analysed for the content of isocyanic acid (ICA) by fourier-transform infrared spectroscopy (FTIR), the result is a measure of the amount of ICA emitted. This measure is taken as the amount of ICA off-gassed in relation to the amount of cured binder composition in the mineral fiber product tested.

The release rates for ICA and other off-gases given are determined according to a Protocol I as described below for standardization in order to achieve comparable data for different products tested at different temperatures. It should be noted that the data obtained are not directly comparable with respect to quantity to the release rates determined for these products when implemented in a technical insulation system at the end customer with the specific conditions on site. For instance, in a real installation at the end customer the product will not be crushed and the binder in the mineral fibre product will not burn out completely as in Protocol I described below. In effect, the values obtained with this Protocol I correspond to a worst case, both in respect to amounts and in respect to release time. Thus, it is expected that the emissions from the products will be lower and released in a slower rate (2-48 hours to reach steady state), whereas this Protocol I has steady state after less than 2 hours in a real installation compared to the values obtained in this study. However, it can be readily assumed that mineral fibre products showing a lower release rate compared to other products according to the Protocol I described will also have a lower release rate in a real installation at the end customer.

Emission measurements from different mineral wool products is usually performed by thorough testing at external institutes such as RISE in Sweden by use of a combination of testing different materials at different thicknesses to determine the dependence of the insulation thickness to the emission curves by quantification by FID signals and IR measurements of the emitted gasses such as CO, $NH_3$, HCN, NOx and ICA.

For the purpose of the present application, Alternative A, the amount of ICA off-gassed is measured according to the Protocol I described below. The internal measurements according to said Protocol I have been made on different grinded mineral wool products to remove the discussions on thickness and porosity. These experiments have been made in a custom-made emission chamber (tube oven) heating the materials to certain temperature setpoints for a certain time. During these experiments, air is passed thought the chamber at a specified rate and is sampled for quantification for different compounds. Four different temperatures (250° C., 350° C., 450° C. and 600° C.) were tested and the emitted gases were quantified by use of fourier transformed infrared spectroscopy. Details on the Protocol I are given below in the experimental part.

It is preferred that the mineral fibre product of the invention also exhibits low emissions of other off-gases such as $NH_3$, HCN, and/or NOx, when the mineral fibre product containing the cured binder composition is subjected to heating.

In a preferred embodiment, heating the mineral fibre product of the invention to a temperature of 600° C. off-gases less than 2500 ppm, such as less than 2000 ppm, such as less than 1500 ppm $NH_3$ per gram solid content per second, and/or heating the mineral fibre product to a temperature of 600° C. off-gases less than 2000 ppm, such as less than 1500 ppm, such as less than 1000 ppm HCN per gram solid content per second.

For the purpose of the present application, the amount of $NH_3$, HCN, and/or NOx off-gassed can be measured according to the same Protocol I described below. Of course, the gas analysis by FTIR is then directed to the compound to be determined.

The mineral fiber products of the invention are suitable for high temperature applications, also with respect to thermal stability. In particular, mineral fiber products of the invention can be used for applications with maximum service temperatures of at least 600° C., preferably at least 650° C. Thus, the mineral fiber product of the invention generally satisfies the conditions for a Maximum Service Temperature (MST) of at least 600° C., preferably at least 650° C. according to the Maximum Service Temperature plate test of EN 14706:2012. The MST is not linked to the thermal degradation and off-gasses but is a mechanical strength.

In general, the uncured binder composition is an aqueous binder composition. In a preferred embodiment, the binders according to the present invention are formaldehyde free.

For the purpose of the present application, the term "formaldehyde free" is defined to characterize a mineral wool product where the emission is below 5 $\mu g/m^2/h$ of formaldehyde from the mineral wool product, preferably below 3 $\mu g/m^2/h$. Preferably, the test is carried out in accordance with ISO 16000 for testing aldehyde emissions.

The uncured binder composition for preparing of the mineral fibre product according to the present invention comprises one or more oxidized lignins as a component (i).

Component (i)

Component (i) is in form of one or more oxidized lignins.

Lignin, cellulose and hemicellulose are the three main organic compounds in a plant cell wall. Lignin can be thought of as the glue, that holds the cellulose fibres together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

FIG. 1 shows a section from a possible lignin structure.

There are at least four groups of technical lignins available in the market. These four groups are shown in FIG. 3. A possible fifth group, Biorefinery lignin, is a bit different as it is not described by the extraction process, but instead by the process origin, e.g. biorefining and it can thus be similar or different to any of the other groups mentioned. Each group is different from each other and each is suitable for different applications. Lignin is a complex, heterogenous material composed of up to three different phenyl propane monomers, depending on the source. Softwood lignins are made mostly with units of coniferyl alcohol, see FIG. 2 and as a result, they are more homogeneous than hardwood lignins, which has a higher content of syringyl alcohol, see FIG. 2. The appearance and consistency of lignin are quite variable and highly contingent on process.

A summary of the properties of these technical lignins is shown in FIG. 4.

Lignosulfonate from the sulfite pulping process remains the largest commercial available source of lignin, with capacity of 1.4 million tonnes. But taking these aside, the kraft process is currently the most used pulping process and is gradually replacing the sulfite process. An estimated 78 million tonnes per year of lignin are globally generated by kraft pulp production but most of it is burned for steam and energy. Current capacity for kraft recovery is estimated at 160,000 tonnes, but sources indicate that current recovery is only about 75,000 tonnes. Kraft lignin is developed from black liquour, the spent liquor from the sulfate or kraft process. At the moment, 3 well-known processes are used to produce the kraft lignin: LignoBoost, LignoForce and SLRP. These 3 processes are similar in that they involve the addition of $CO_2$ to reduce the pH to 9-10, followed by acidification to reduce pH further to approximately 2. The final step involves some combination of washing, leaching and filtration to remove ash and other contaminants. The three processes are in various stages of commercialization globally.

The kraft process introduces thiol groups, stilbene while some carbohydrates remain. Sodium sulphate is also present as an impurity due to precipitation of lignin from liquor with sulphuric acid but can potentially be avoided by altering the way lignin is isolated. The kraft process leads to high amount of phenolic hydroxyl groups and this lignin is soluble in water when these groups are ionized (above pH-10).

Commercial kraft lignin is generally higher in purity than lignosulfonates. The molecular weight are 1000-3000 g/mol·s Soda lignin originates from sodium hydroxide pulping processes, which are mainly used for wheat straw, bagasse and flax. Soda lignin properties are similar to kraft lignins one in terms of solubility and $T_g$. This process does not utilize sulphur and there is no covalently bound sulphur. The ash level is very low. Soda lignin has a low solubility in neutral and acid media but is completely soluble at pH 12 and higher.

The lignosulfonate process introduces large amount of sulphonate groups making the lignin soluble in water but also in acidic water solutions. Lignosulfonates has up to 8% sulfur as sulphonate, whereas kraft lignin has 1-2% sulfur, mostly bonded to the lignin. The molecular weight of lignosulfonate is 15.000-50.000 g/mol. This lignin contains more leftover carbohydrates compared to other types and has a higher average molecular weight. The typical hydrophobic core of lignin together with large number of ionized sulphonate groups make this lignin attractive as a surfactant and it often finds application in dispersing cement etc.

A further group of lignins becoming available is lignins resulting from biorefining processes in which the carbohydrates are separated from the lignin by chemical or biochemical processes to produce a carbohydrate rich fraction. This remaining lignin is referred to as biorefinery lignin. Biorefineries focus on producing energy, and producing substitutes for products obtained from fossil fuels and petrochemicals as well as lignin. The lignin from this process is in general considered a low value product or even a waste product mainly used for thermal combustion or used as low grade fodder or otherwise disposed of.

Organosolv lignin availability is still considered on the pilot scale. The process involves extraction of lignin by using water together with various organic solvents (most often ethanol) and some organic acids. An advantage of this process is the higher purity of the obtained lignin but at a much higher cost compared to other technical lignins and with the solubility in organic solvents and not in water.

Previous attempts to use lignin as a basic compound for binder compositions for mineral fibres failed because it proved difficult to find suitable cross-linkers which would achieve desirable mechanical properties of the cured mineral wool product and at the same time avoid harmful and/or corrosive components. Presently lignin is used to replace oil derived chemicals, such as phenol in phenolic resins in binder applications or in bitumen. It is also used as cement and concrete additives and in some aspects as dispersants.

The cross-linking of a polymer in general should provide improved properties like mechanical, chemical and thermal resistance etc. Lignin is especially abundant in phenolic and aliphatic hydroxyl groups that can be reacted leading to cross-linked structure of lignin. Different lignins will also have other functional groups available that can potentially be used. The existence of these other groups is largely dependent on the way lignin was separated from cellulose and hemicellulose (thiols in kraft lignin, sulfonates in lignosulfonate etc.) depending on the source.

It has been found that by using oxidized lignins, binder compositions for mineral fibres can be prepared which allow excellent properties of the mineral fibre product produced therewith and at the same time do not require components to be included into the binder compositions so that the mineral fibre product of the invention can be used in high temperature applications with low levels of ICA emission or even with no emission of ICA.

In one embodiment, the component (i) is in form of one or more oxidized kraft lignins.

In one embodiment, the component (i) is in form of one or more oxidized soda lignins.

In one embodiment, the component (i) is in form of one or more ammonia-oxidized lignins. For the purpose of the present invention, the term "ammonia-oxidized lignins" is to be understood as a lignin that has been oxidized by an oxidation agent in the presence of ammonia. The term "ammonia-oxidized lignin" is abbreviated as AOL.

In an alternative embodiment, the ammonia is partially or fully replaced by an alkali metal hydroxide, in particular sodium hydroxide and/or potassium hydroxide.

A typical oxidation agent used for preparing the oxidized lignins is hydrogen peroxide.

In one embodiment, the ammonia-oxidized lignin comprises one or more of the compounds selected from the group of ammonia, amines, hydroxides or any salts thereof.

In one embodiment, the component (i) is having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i).

In the binder composition, preferably the aqueous binder composition, used according to the present invention, component (i), i.e. the one or more oxidized lignins, may be present in an amount of 25 to 95 wt.-%, such as 30 to 90 wt.-%, such as 35 to 85 wt.-%, based on the dry weight of the binder composition.

In one embodiment, the component (i) is having an average carboxylic acid group content of more than 1.5 groups per macromolecule of component (i), such as more than 2 groups, such as more than 2.5 groups.

It is believed that the carboxylic acid group content of the oxidized lignins plays an important role in the surprising advantages of the aqueous binder compositions for mineral fibres according to the present invention. In particular, it is believed that the carboxylic acid group of the oxidized lignins improve the cross-linking properties and therefore allow better mechanical properties of the cured mineral fibre products.

In a preferred embodiment, the non-cured binder composition, which is preferably an aqueous binder composition, for preparing the mineral fibre product according to the present invention comprises a component (i) in form of one or more oxidized lignins;
a component (ii) in form of one or more cross-linkers;
optionally a component (iii) in form of one or more plasticizers.

Component (ii)

Optional component (ii) is in form of one or more cross-linkers.

In one embodiment, the component (ii) comprises in one embodiment one or more cross-linkers selected from β-hydroxyalkylamide-cross-linkers and/or oxazoline-cross-linkers.

β-hydroxyalkylamide-cross-linkers is a curing agent for the acid-functional macromolecules. It provides a hard, durable, corrosion resistant and solvent resistant cross-linked polymer network. It is believed the β-hydroxyalkylamide cross-linkers cure through esterification reaction to form multiple ester linkages. The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing crosslinkers can easily be obtained by polymerizing an oxazoline derivative. The U.S. Pat. No. 6,818,699 B2 provides a disclosure for such a process.

In one embodiment, the component (ii) is an epoxidised oil based on fatty acid triglyceride.

It is noted that epoxidised oils based on fatty acid triglycerides are not considered hazardous and therefore the use of these compounds in the binder compositions according to the present invention do not render these compositions unsafe to handle.

In one embodiment, the component (ii) is a molecule having 3 or more epoxy groups.

In one embodiment, the component (ii) is one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups.

In one embodiment, component (ii) is selected from the group consisting of cross-linkers taking part in a curing reaction, such as hydroxyalkylamide, alkanolamine, a reaction product of an alkanolamine and a polycarboxylic acid. The reaction product of an alkanolamine and a polycarboxylic acid can be found in U.S. Pat. No. 6,706,853B1.

Without wanting to be bound by any particular theory, it is believed that the very advantageous properties of the binder compositions, preferably the aqueous binder compositions, according to the present invention are due to the interaction of the oxidized lignins used as component (i) and the cross-linkers mentioned above. It is believed that the presence of carboxylic acid groups in the oxidized lignins enable the very effective cross-linking of the oxidized lignins.

In one embodiment, the component (ii) is one or more cross-linkers selected from the group consisting of multifunctional organic amines such as an alkanolamine, diamines, such as hexamethyldiamine, triamines.

In one embodiment, the component (ii) is one or more cross-linkers selected from the group consisting of polyethylene imine, polyvinyl amine, fatty amines.

In one embodiment, the component (ii) is one or more fatty amides.

In one embodiment, the component (ii) is one or more cross-linkers selected from the group consisting of dimethoxyethanal, glycolaldehyde, glyoxalic acid.

In one embodiment, the component (ii) is one or more cross-linkers selected from polyester polyols, such as polycaprolactone.

In one embodiment, the component (ii) is one or more cross-linkers selected from the group consisting of starch, modified starch, CMC.

In one embodiment, the component (ii) is one or more cross-linkers in form of aliphatic multifunctional carbodiimides;

In one embodiment, the component (ii) is one or more cross-linkers selected from melamine based cross-linkers, such as a hexakis(methylmethoxy)melamine (HMMM) based cross-linkers.

Examples of such compounds are Picassian XL 701, 702, 725 (Stahl Polymers), such as ZOLDINE® XL-29SE (Angus Chemical Company), such as CX300 (DSM), such as Carbodilite V-02-L2 (Nisshinbo Chemical Inc.).

In one embodiment, component (ii) is Primid XL552, which has the following structure:

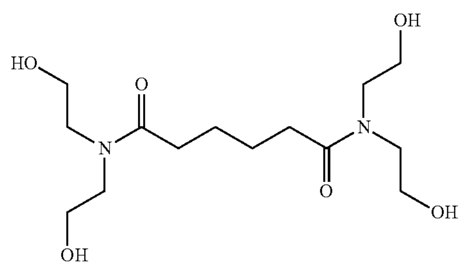

Primid XL-552

Component (ii) can also be any mixture of the above mentioned compounds.

In one embodiment, the binder composition according to the present invention comprises component (ii) in an amount of 1 to 40 wt.-%, such as 4 to 20 wt.-%, such as 6 to 12 wt.-%, based on the dry weight of component (i).

Component (iii)

Optional component (iii) is in form of one or more plasticizers.

In one embodiment, component (iii) is in form of one or more plasticizers selected from the group consisting of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

In one embodiment, component (iii) is in form of one or more plasticizers selected from the group consisting of carbonates, such as ethylene carbonate, propylene carbonate, lactones, lactams, lactides, compounds with a structure similar to lignin like vanillin, acetosyringone, solvents used as coalescing agents like alcohol ethers, polyvinyl alcohol.

In one embodiment, component (iii) is in form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferullic acid, polyurethane dispersions, acrylic based polymers with free carboxy groups, compounds with a structure similar to lignin like vanillin, acetosyringone.

In one embodiment, component (iii) is in form of one or more plasticizers selected from the group consisting of fatty alcohols, monohydroxy alcohols such as pentanol, stearyl alcohol.

In one embodiment, component (iii) comprises one or more plasticizers selected from the group consisting of polyethylene glycols, polyethylene glycol ethers.

Another particular surprising aspect of the present invention is that the use of plasticizers having a boiling point of more than 100° C., in particular 140 to 250° C., strongly improves the mechanical properties of the mineral fibre products according to the present invention although, in view of their boiling point, it is likely that these plasticizers will at least in part evaporate during the curing of the binders, preferably the aqueous binders, in contact with the mineral fibres.

In one embodiment, component (iii) comprises one or more plasticizers having a boiling point of more than 100° C., such as 110 to 280° C., more preferred 120 to 260° C., more preferred 140 to 250° C.

It is believed that the effectiveness of these plasticizers in the binder composition, preferably the aqueous binder composition used according to the present invention is associated with the effect of increasing the mobility of the oxidized lignins during the curing process. It is believed that the increased mobility of the lignins or oxidized lignins during the curing process facilitates the effective cross-linking.

In one embodiment, component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) comprises one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is selected from the group consisting of fatty alcohols, monohydroxy alcohols, such as pentanol, stearyl alcohol.

In one embodiment, component (iii) is selected from one or more plasticizers selected from the group consisting of alkoxylates such as ethoxylates such as butanol ethoxylates, such as butoxytriglycol.

In one embodiment, component (iii) is selected from one or more propylene glycols.

In one embodiment, component (iii) is selected from one or more glycol esters.

In one embodiment, component (iii) is selected from one or more plasticizers selected from the group consisting of adipates, acetates, benzoates, cyclobenzoates, citrates, stearates, sorbates, sebacates, azelates, butyrates, valerates.

In one embodiment, component (iii) is selected from one or more plasticizers selected from the group consisting of phenol derivatives such as alkyl or aryl substituted phenols.

In one embodiment, component (iii) is selected from one or more plasticizers selected from the group consisting of silanols, siloxanes.

In one embodiment, component (iii) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iii) is selected from one or more hydroxy acids.

In one embodiment, component (iii) is selected from one or more plasticizers selected from the group consisting of monomeric amides such as acetamides, benzamide, fatty acid amides such as tall oil amides.

In one embodiment, component (iii) is selected from one or more plasticizers selected from the group consisting of quaternary ammonium compounds such as trimethylglycine, distearyldimethylammoniumchloride.

In one embodiment, component (iii) is selected from one or more plasticizers selected from the group consisting of vegetable oils such as castor oil, palm oil, linseed oil, tall oil, soybean oil.

In one embodiment, component (iii) is in form of tall oil.

In one embodiment, component (iii) is selected from one or more plasticizers selected from the group consisting of hydrogenated oils, acetylated oils.

In one embodiment, component (iii) is selected from one or more fatty acid methyl esters.

In one embodiment, component (iii) is selected from one or more plasticizers selected from the group consisting of alkyl polyglucosides, gluconamides, aminoglucoseamides, sucrose esters, sorbitan esters.

It has surprisingly been found that the inclusion of plasticizers in the binder compositions, preferably the aqueous binder compositions, used according to the present invention strongly improves the mechanical properties of the mineral fibre products according to the present invention.

The term plasticizer refers to a substance that is added to a material in order to make the material softer, more flexible (by decreasing the glass-transition temperature Tg) and easier to process.

Component (iii) can also be any mixture of the above mentioned compounds.

In one embodiment, component (iii) is present in an amount of 0.5 to 50, preferably 2.5 to 25, more preferably 3 to 15 wt.-%, based on the dry weight of component (i).

Binder composition, preferably aqueous binder composition, for mineral fibers comprising components (i) and (iia)

In one embodiment the present invention is directed to a binder composition, preferably an aqueous binder composition, for mineral fibers comprising:

a component (i) in form of one or more oxidized lignins;
a component (iia) in form of one or more modifiers.

The present inventors have found that the excellent binder properties can also be achieved by a two-component system which comprises component (i) in form of one or more oxidized lignins and a component (iia) in form of one or more modifiers, and optionally any of the other components mentioned above and below.

In one embodiment, component (iia) is a modifier in form of one or more compounds selected from the group consisting of epoxidised oils based on fatty acid triglycerides.

In one embodiment, component (iia) is a modifier in form of one or more compounds selected from molecules having 3 or more epoxy groups.

In one embodiment, component (iia) is a modifier in form of one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups.

In one embodiment, component (iia) is one or more modifiers selected from the group consisting of polyethylene imine, polyvinyl amine, fatty amines.

In one embodiment, the component (iia) is one or more modifiers selected from aliphatic multifunctional carbodiimides.

Component (iia) can also be any mixture of the above mentioned compounds.

Without wanting to be bound by any particular theory, the present inventors believe that the excellent binder properties achieved by the binder composition for mineral fibers comprising components (i) and (iia), and optional further components, are at least partly due to the effect that the modifiers used as components (iia) at least partly serve the function of a plasticizer and a crosslinker.

In one embodiment, the binder composition, preferably the aqueous binder composition, comprises component (iia) in an amount of 1 to 40 wt.-%, such as 4 to 20 wt.-%, such as 6 to 12 wt.-%, based on the dry weight of the component (i).

Further Components

In some embodiments, the binder composition, preferably the aqueous binder composition, used according to the present invention comprises further components.

In one embodiment, the binder composition, preferably the aqueous binder composition, used according to the present invention comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid, and/or sodium polyphosphate (STTP), and/or sodium metaphosphate (STMP), and/or phosphorous oxychloride. The presence of such a catalyst can improve the curing properties of the binder composition, preferably the aqueous binder compositions, used according to the present invention.

In one embodiment, the binder composition, preferably the aqueous binder composition, used according to the present invention comprises a catalyst selected from Lewis acids, which can accept an electron pair from a donor compound forming a Lewis adduct, such as $ZnCl_2$, $Mg(ClO4)_2$, $Sn[N(SO_2\text{-n-}C8F17)_2]_4$.

In one embodiment, the binder composition, preferably the aqueous binder composition, used according to the present invention comprises a catalyst selected from metal chlorides, such as KCl, $MgCl_2$, $ZnCl_2$, $FeCl_3$ and $SnCl_2$.

In one embodiment, the binder composition, preferably the aqueous binder composition, used according to the present invention comprises a catalyst selected from organometallic compounds, such as titanate-based catalysts and stannum based catalysts.

In one embodiment, the binder composition, preferably the aqueous binder composition, used according to the present invention comprises a catalyst selected from chelating agents, such as transition metals, such as iron ions, chromium ions, manganese ions, copper ions.

In one embodiment, the binder composition, preferably the aqueous binder composition, used according to the present invention further comprises a further component (iv) in form of one or more silanes.

In one embodiment, the binder composition, preferably the aqueous binder composition, used according to the present invention comprises a further component (iv) in form of one or more coupling agents, such as organofunctional silanes.

In one embodiment, component (iv) is selected from group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea funtionalised silanes or vinyl functionalized silanes.

In one embodiment, the binder composition, preferably the aqueous binder composition, used according to the present invention further comprises a component (v) in form of one or more components selected from the group of ammonia, amines or any salts thereof.

It has been found that the inclusion of ammonia, amines or any salts thereof as a further component can in particular be useful when oxidized lignins are used in component (i), which oxidised lignin have not been oxidized in the presence of ammonia.

In one embodiment, the binder composition, preferably the aqueous binder composition, used according to the present invention further comprises a further component in form of urea, in particular in an amount of 5 to 40 wt.-%, such as 10 to 30 wt.-%, 15 to 25 wt.-%, based on the dry weight of component (i).

In one embodiment, the binder composition, preferably the aqueous binder composition, used according to the present invention further comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99.

In one embodiment, the binder composition, preferably the aqueous binder composition, used according to the present invention further comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In the context of the present invention, a binder composition having a sugar content of 50 wt.-% or more, based on the total dry weight of the binder components, is considered to be a sugar based binder. In the context of the present invention, a binder composition having a sugar content of less than 50 wt.-%, based on the total dry weight of the binder components, is considered a non-sugar based binder.

In one embodiment, the binder composition, preferably the aqueous adhesive composition, used according to the present invention further comprises a further component in form of one or more surface active agents that are in the form of non-ionic and/or ionic emulsifiers such as polyoxyethylenes (4) lauryl ether, such as soy lecithin, such as sodium dodecyl sulfate.

In one embodiment, the binder composition, preferably the aqueous binder composition, used according to the present invention comprises

- a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
- a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines;
- a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the binder composition, preferably the aqueous binder composition, comprises component (ii) in an amount of 1 to 40 wt.-%, such as 4 to 20 wt.-%, 6 to 12 wt.-%, based on the dry weight of component (i), and (iii) is present in an amount of 0.5 to 50, preferably 2.5 to 25, more preferably 3 to 15 wt.-%, based on the dry weight of component (i).

In one embodiment, the binder composition, preferably the aqueous binder composition, used according to the present invention comprises

- a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
- a component (iia) in form of one or more modifiers selected from epoxidised oils based on fatty acid triglycerides.

In one embodiment, the binder composition, preferably the aqueous binder composition, used according to the present invention comprises

- a component (i) in form of one or more ammonia-oxidized lignins having an average carboxylic acid group content of more than 1.5 groups per macromolecule of component (i), such as more than 2 groups, such as more than 2.5 groups;
- a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines;
- a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the binder composition, preferably the aqueous binder composition, comprises component (ii) in an amount of 1 to 40 wt.-%, such as 4 to 20 wt.-%, 6 to 12 wt.-%, based on the dry weight of component (i), and (iii) is present in an amount of 0.5 to 50, preferably 2.5 to 25, more preferably 3 to 15 wt.-%, based on the dry weight of component (i).

In one embodiment, the binder composition, preferably the aqueous binder composition, used according to the present invention comprises

- a component (i) in form of one or more ammonia-oxidized lignins having an average carboxylic acid group content of more than 1.5 groups per macromolecule of component (i), such as more than 2 groups, such as more than 2.5 groups;
- a component (iia) in form of one or more modifiers selected from epoxidised oils based on fatty acid triglycerides.

In one embodiment, the binder composition, preferably the aqueous binder composition, used according to the present invention consists essentially of

- a component (i) in form of one or more oxidized lignins;
- a component (ii) in form of one or more cross-linkers;
- a component (iii) in form of one or more plasticizers;

- a component (iv) in form of one or more coupling agents, such as organofunctional silanes;
- optionally a component in form of one or more compounds selected from the group of ammonia, amines or any salts thereof;
- optionally a component in form of urea;
- optionally a component in form of a more reactive or non-reactive silicones;
- optionally a hydrocarbon oil;
- optionally one or more surface active agents;
- water.

In one embodiment, the binder composition, preferably the aqueous binder composition, used according to the present invention consists essentially of

- a component (i) in form of one or more oxidized lignins;
- a component (iia) in form of one or more modifiers selected from epoxidised oils based on fatty acid triglycerides;
- a component (iv) in form of one or more coupling agents, such as organofunctional silanes;
- optionally a component in form of one or more compounds selected from the group of ammonia, amines or any salts thereof;
- optionally a component in form of urea;
- optionally a component in form of a more reactive or non-reactive silicones;
- optionally a hydrocarbon oil;
- optionally one or more surface active agents;
- water.

A Method for Producing a Mineral Fibre Product

The mineral fibre product of the present invention is prepared by a common method for producing a mineral fibre product by binding mineral fibres with the binder composition. Accordingly, the mineral fibre product of the present invention is preferably prepared by a method which comprises the steps of contacting mineral fibres with an uncured and preferably aqueous binder composition comprising one or more oxidized lignins. In a preferred embodiment, the uncured and preferably aqueous binder composition comprises

- a component (i) in form of one or more oxidized lignins;
- a component (ii) in form of one or more cross-linkers;
- optionally a component (iii) in form of one or more plasticizers.

Curing

The uncured binder composition in mineral fiber product precursor such as a web where the mineral fibers are in contact with the binder composition is cured by a chemical and/or physical reaction of the binder components.

In one embodiment, the curing takes place in a curing device.

In one embodiment, the curing is carried out at temperatures from 100 to 300° C., such as 170 to 270° C., such as 180 to 250° C., such as 190 to 230° C.

In one embodiment, the curing takes place in a conventional curing oven for mineral wool production operating at a temperature of from 150 to 300° C., such as 170 to 270° C., such as 180 to 250° C., such as 190 to 230° C.

In one embodiment, the curing takes place for a time of 30 seconds to 20 minutes, such as 1 to 15 minutes, such as 2 to 10 minutes.

In a typical embodiment, curing takes place at a temperature of 150 to 250° C. for a time of 30 seconds to 20 minutes.

The curing process may commence immediately after application of the binder to the fibres. The curing is defined as a process whereby the binder composition undergoes a physical and/or chemical reaction which in case of a chemical reaction usually increases the molecular weight of the compounds in the binder composition and thereby increases the viscosity of the binder composition, usually until the binder composition reaches a solid state.

In one embodiment the curing process comprises drying by pressure. The pressure may be applied by blowing air or gas through/over the mixture of mineral fibres and binder.

Mineral Fibre Product According to the Present Invention

The present invention is directed to a mineral fibre product comprising mineral fibres in contact with a cured binder composition as described above, i.e. in contact with a cured binder resulting from the curing of the binder composition, preferably aqueous binder composition, described above.

The mineral fibres employed may be any of man-made vitreous fibres (MMVF), glass fibres, ceramic fibres, basalt fibres, slag fibres, rock fibres, stone fibres and others. These fibres may be present as a wool product, e.g. like a stone wool product.

Fibre/Melt Composition

The man-made vitreous fibres (MMVF) can have any suitable oxide composition. The fibres can be glass fibres, ceramic fibres, basalt fibres, slag fibres or rock or stone fibres. The fibres are preferably of the types generally known as rock, stone or slag fibres, most preferably stone fibres.

Stone fibres commonly comprise the following oxides, in percent by weight:

- $SiO_2$: 30 to 51
- CaO: 8 to 30
- MgO: 2 to 25
- FeO (including $Fe_2O_3$): 2 to 15
- $Na_2O+K_2O$: not more than 10
- CaO+MgO: 10 to 30

In preferred embodiments the MMVF have the following levels of elements, calculated as oxides in wt %:

- $SiO_2$: at least 30, 32, 35 or 37; not more than 51, 48, 45 or 43
- $Al_2O_3$: at least 12, 16 or 17; not more than 30, 27 or 25
- CaO: at least 8 or 10; not more than 30, 25 or 20
- MgO: at least 2 or 5; not more than 25, 20 or 15
- FeO (including $Fe_2O_3$): at least 4 or 5; not more than 15, 12 or 10
- FeO+MgO: at least 10, 12 or 15; not more than 30, 25 or 20
- $Na_2O+K_2O$: zero or at least 1; not more than 10
- CaO+MgO: at least 10 or 15; not more than 30 or 25
- TiO2: zero or at least 1; not more than 6, 4 or 2
- $TiO_2$+FeO: at least 4 or 6; not more than 18 or 12
- $B_2O_3$: zero or at least 1; not more than 5 or 3
- $P_2O_5$: zero or at least 1; not more than 8 or 5
- Others: zero or at least 1; not more than 8 or 5

The MMVF made by the method of the invention preferably have the composition in wt %:

| | |
|---|---|
| $SiO_2$ | 35 to 50 |
| $Al_2O_3$ | 12 to 30 |
| $TiO_2$ | up to 2 |
| $Fe_2O_3$ | 3 to 12 |
| CaO | 5 to 30 |
| MgO | up to 15 |
| $Na_2O$ | 0 to 15 |
| K2O | 0 to 15 |
| $P_2O_5$ | up to 3 |
| MnO | up to 3 |
| $B_2O_3$ | up to 3 |

Another preferred composition for the MMVF is as follows in wt %:

$SiO_2$ 39-55% preferably 39-52%

$Al_2O_3$16-27% preferably 16-26%

CaO 6-20% preferably 8-18%

MgO 1-5% preferably 1-4.9%

$Na_2O$ 0-15% preferably 2-12%

$K_2O$ 0-15% preferably 2-12%

$R_2O$ ($Na_2O+K_2O$) 10-14.7% preferably 10-13.5%

$P_2O_5$ 0-3% preferably 0-2%

$Fe_2O_3$ (iron total) 3-15% preferably 3.2-8%

$B_2O_3$ 0-2% preferably 0-1%

$TiO_2$ 0-2% preferably 0.4-1%

Others 0-2.0%

Glass fibres commonly comprise the following oxides, in percent by weight:

$SiO_2$: 50 to 70

$Al_2O_3$: 10 to 30

CaO: not more than 27

MgO: not more than 12

Glass fibres can also contain the following oxides, in percent by weight:

$Na_2O+K_2O$: 8 to 18, in particular $Na_2O+K_2O$ greater than CaO+MgO $B_2O_3$: 3 to 12

Some glass fibre compositions can contain $Al_2O_3$: less than 2%.

Suitable fibre formation methods and subsequent production steps for manufacturing the mineral fibre product are those conventional in the art. Generally, the binder is sprayed immediately after fibrillation of the mineral melt on to the air-borne mineral fibres. The uncured and preferably aqueous binder composition is normally applied in an amount of 0.1 to 18%, preferably 0.2 to 8% by weight, of the bonded mineral fibre product on a dry basis.

The spray-coated mineral fibre web is generally cured in a curing oven by means of a hot air stream. The hot air stream may be introduced into the mineral fibre web from below, or above or from alternating directions in distinctive zones in the length direction of the curing oven.

Typically, the curing oven is operated at a temperature of from about 150° C. to about 300° C., such as 170 to 270° C., such as 180 to 250° C., such as 190 to 230° C. Generally, the curing oven residence time is from 30 seconds to 20 minutes, such as 1 to 15 minutes, such as 2 to 10 minutes, depending on, for instance, the product density.

In a typical embodiment, the mineral fiber product according to the present invention is cured at a temperature of 150° C. to 250° C. for a time of 30 seconds to 20 minutes.

If desired, the mineral fibre web may be subjected to a shaping process before curing. The bonded mineral fibre product emerging from the curing oven may be cut to a desired format e.g., in the form of a batt.

In a preferred embodiment, the mineral fiber product according to the present invention is a thermal isolation product. The mineral fiber product is preferably in form of a preformed pipe section, a wired mat or a slab.

In a preferred embodiment, the mineral fiber product according to the present has a thickness in the range of 20 mm to 500 mm, preferably 30 mm to 300 mm, such as 50 mm to 150 mm, wherein in general the mineral fibre product is in form of a sheet.

The mineral fibre products according to the present invention generally have a density within the range of from 6 to 250 kg/m$^3$, preferably 20 to 200 kg/m$^3$. The mineral fibre products generally have a loss on ignition (LOI) within the range of 0.25 to 18.0% or 0.3 to 18.0%, preferably 0.5 to 8.0%. In a preferred embodiment, the mineral fibre product has a loss on ignition (LOI) of 0.25 to 8.0% or 0.3 to 8.0%, more preferably 0.25 to 6.0%.

Use of the Mineral Fibre Product According to the Present Invention

A use according to the present invention of a mineral fibre product is directed to a high temperature application. A high temperature application here means the use of the mineral fibre product at a temperature of at least 300° C., preferably, at least 400° C., such as at least 450° C. and/or up to 700° C.

Accordingly, the invention also relates to a use of a mineral fibre product, comprising mineral fibres bound by a cured binder composition, the non-cured binder composition comprising one or more oxidized lignins, at a temperature of at least 300° C., preferably at least 400° C. such as at least 450° C. In general, the inventive use is at a temperature of not more than 700° C., preferably not more than 650° C.

In general, it is preferred that heating of the mineral fibre product to a temperature of 600° C. off-gases less than 1500 ppm isocyanic acid (ICA) per gram solid content per second, more preferably less than 1000 ppm isocyanic acid (ICA) per gram solid content per second, still more preferably less than 750 ppm isocyanic acid (ICA) per gram solid content per second. The method for determining the ICA emission rate is described below.

In a preferred embodiment of the use according to the invention, the mineral fibre product is used as a thermal insulation product, more preferably as a thermal pipe insulation.

With respective to the inventive use, it is preferred that the pipe is operated at high use temperatures of at least 300° C., preferably at least 400° C., such as at least 450° C. In general, the temperature is not more than 700° C., preferably not more than 650° C.

The pipe is preferably a metal pipe. In particular, the pipe is used to transport a medium, such as a gas, a steam or a fluid. The medium transported through the pipe is usually a high temperature medium having the minimum use temperature described above.

The mineral fiber product for the use according to the invention can have all features which have been described above for the inventive mineral fiber product so that reference is made thereto.

Method of Transporting a Medium According to the Present Invention

The invention also relates to a method for transporting a medium, comprising the steps of a) covering a pipe with a mineral fibre product as a thermal pipe insulation, and b) transporting the medium through the pipe, wherein the mineral fibre product comprises mineral fibres bound by a cured binder composition, the non-cured binder composition comprising one or more oxidized lignins.

In general, it is preferred that heating of the mineral fibre product to a temperature of 600° C. off-gases less than 1500 ppm isocyanic acid (ICA) per gram solid content per second, such as less than 1000 ppm isocyanic acid (ICA) per gram solid content per second, preferably less than 750 ppm isocyanic acid (ICA) per gram solid content per second. The method for determining the ICA emission rate is described below.

In a preferred embodiment, the medium transported has a temperature of at least 300° C., preferably at least 400° C., such as at least 450° C. Preferably, the temperature is not more than 700° C., preferably not more than 650° C.

The medium transported through the pipe may be for instance a gas, a steam or a fluid.

The mineral fiber product used in the method according to the invention can have all features which have been described above for the inventive mineral fiber product so that reference is made thereto.

Pipe with Thermal Insulation According to the Present Invention

The invention also relates to a pipe covered or wrapped with a mineral fibre product as a thermal insulation, wherein the mineral fibre product comprises mineral fibres bound by a cured binder composition, the non-cured binder composition comprising one or more oxidized lignins.

In general, it is preferred that heating of the mineral fibre product to a temperature of 600° C. off-gases less than 1500 ppm isocyanic acid (ICA) per gram solid content per second, preferably less than 1000 ppm isocyanic acid (ICA) per gram solid content per second, more preferably less than 750 ppm isocyanic acid (ICA) per gram solid content per second. The method for determining the ICA emission rate is described below.

The mineral fiber product for covering the pipe according to the invention can have all features which have been described above for the inventive mineral fiber product so that reference is made thereto.

Alternative B (Fifth to Eighth Aspect of the Invention)

SUMMARY OF THE INVENTION

As indicated above, it was an object of the present invention to provide a mineral fibre product which has improved high temperature use, is economically produced and is using renewable materials as starting products for the preparation of the aqueous binder composition.

A further object of the present invention was to provide a use of such mineral fibre product.

A further object of the present invention was to provide a method of transporting a medium through a pipe at high temperatures.

In accordance with a fifth aspect of the present invention, there is provided a mineral fibre product, comprising mineral fibres bound by a cured binder composition, the non-cured binder composition comprising one or more oxidized lignins, wherein heating of the mineral fibre product to a temperature of 600° C. off-gases less than 1000 μg isocyanic acid (ICA) per gram of sample, such as less than 750 μg isocyanic acid (ICA) per gram of sample, such as less than 500 μg isocyanic acid (ICA) per gram of sample, such as less than 250 μg isocyanic acid (ICA) per gram of sample, such as less than 100 μg isocyanic acid (ICA) per gram of sample.

In accordance with a sixth aspect of the present invention, there is provided a use of a mineral fibre product, comprising mineral fibres bound by a cured binder composition, the non-cured binder composition comprising one or more oxidized lignins, at a temperature of at least 300° C., preferably as a thermal insulation product, wherein optionally heating of the mineral fibre product to a temperature of 600° C. off-gases less than 1000 μg isocyanic acid (ICA) per gram of sample, such as less than 750 μg isocyanic acid (ICA) per gram of sample, such as less than 500 μg isocyanic acid (ICA) per gram of sample, such as less than 250 μg isocyanic acid (ICA) per gram of sample, such as less than 100 μg isocyanic acid (ICA) per gram of sample.

In accordance with a seventh aspect of the present invention, there is provided a method for transporting a medium, comprising the steps of a) covering a pipe with a mineral fibre product as a thermal pipe insulation, and b) transporting the medium through the pipe, wherein the mineral fibre product comprises mineral fibres bound by a cured binder composition, the non-cured binder composition comprising one or more oxidized lignins, as a thermal pipe insulation, wherein optionally heating of the mineral fibre product to a temperature of 600° C. off-gases less than 1000 μg isocyanic acid (ICA) per gram of sample, such as less than 750 μg isocyanic acid (ICA) per gram of sample, such as less than 500 μg isocyanic acid (ICA) per gram of sample, such as less than 250 μg isocyanic acid (ICA) per gram of sample, such as less than 100 μg isocyanic acid (ICA) per gram of sample.

In accordance with a eighth aspect of the present invention, there is provided a pipe covered with a mineral fibre product as a thermal insulation, wherein the mineral fibre product comprises mineral fibres bound by a cured binder composition, the non-cured binder composition comprising one or more oxidized lignins, wherein optionally heating of the mineral fibre product to a temperature of 600° C. off-gases less than 1000 μg isocyanic acid (ICA) per gram of sample, such as less than 750 μg isocyanic acid (ICA) per gram of sample, such as less than 500 μg isocyanic acid (ICA) per gram of sample, such as less than 250 μg isocyanic acid (ICA) per gram of sample, such as less than 100 μg isocyanic acid (ICA) per gram of sample.

The present inventors have surprisingly found that it is possible to use a mineral fibre product in high temperature applications with low ICA emissions or even without ICA emissions, when a binder composition based on oxidized lignin is used for the mineral fibre product.

DESCRIPTION OF THE PREFERRED EMBODIMENTS

The mineral fibre product of the invention comprises mineral fibres bound by a cured binder composition, the non-cured binder composition comprising one or more oxidized lignins, wherein heating of the mineral fibre product to a temperature of 600° C. off-gases less than 1000 μg isocyanic acid (ICA) per gram of sample, preferably less than 750 μg isocyanic acid (ICA) per gram of sample, such as less than 500 μg isocyanic acid (ICA) per gram of sample, such as less than 250 μg isocyanic acid (ICA) per gram of sample, such as less than 100 μg isocyanic acid (ICA) per gram of sample.

The mineral fibre product heated comprises the cured binder composition. With respect to “gram of sample” the gram of sample refers to the sample weight as is defined according to a Protocol II below.

When a mineral fibre product which comprises the cured binder composition is subjected to heating at a certain temperature and the off-gases are quantitatively analysed for the content of isocyanic acid (ICA) by fourier-transform infrared spectroscopy (FTIR), the result is a measure of the amount of ICA emitted. This measure is taken as the amount of ICA off-gassed in relation to the amount of cured binder composition in the mineral fiber product tested.

The total release of ICA and other off-gases given are determined according to a Protocol II as described below for standardization in order to achieve comparable data for different products tested at different temperatures. It should be noted that the data obtained are not directly comparable with respect to quantity to the release determined for these products when implemented in a technical insulation system at the end customer with the specific conditions on site. For instance, in a real installation at the end customer the product will not be crushed and the binder in the mineral fibre product will not burn out completely as in Protocol II described below. In effect, the values obtained with this Protocol II correspond to a worst case, both in respect to amounts and in respect to release time. Thus, it is expected that the emissions from the products will be lower and released in a slower rate (2-48 hours to reach steady state), whereas this Protocol II has steady state after less than 2 hours in a real installation compared to the values obtained in this study. However, it can be readily assumed that mineral fibre products showing a lower total release compared to other products according to the Protocol II described will also have a lower total release in a real installation at the end customer.

Emission measurements from different mineral wool products is usually performed by thorough testing at external institutes such as RISE in Sweden by use of a combination of testing different materials at different thicknesses to determine the dependence of the insulation thickness to the emission curves by quantification by FID signals and IR measurements of the emitted gasses such as CO, $NH_3$, HCN, NOx and ICA.

For the purpose of the present application, Alternative B, the total amount of ICA off-gassed is measured according to the Protocol II described below. The internal measurements according to said Protocol II have been made on different grinded mineral wool products to remove the discussions on thickness and porosity. These experiments have been made in a custom-made emission chamber (tube oven) heating the materials to certain temperature setpoints for a certain time. During these experiments, air is passed thought the chamber at a specified rate and is sampled for quantification for different compounds. Four different temperatures (250° C., 350° C., 450° C. and 600° C.) were tested and the emitted gases were quantified by use of fourier transformed infrared spectroscopy. Details on the Protocol II are given below in the experimental part.

It is preferred that the mineral fibre product of the invention also exhibits low emissions of other off-gases such as $NH_3$, HCN, and/or NOx, when the mineral fibre product containing the cured binder composition is subjected to heating.

In a preferred embodiment, heating the mineral fibre product to a temperature of 600° C. off-gases less than 500 μg HCN per gram of sample, such as less than 250 μg HCN per gram of sample, such as less than 100 μg HCN per gram of sample, such as less than 50 μg HCN per gram of sample.

For the purpose of the present application, the total amount of HCN off-gassed can be measured according to the same Protocol II described below. Of course, the gas analysis by FTIR is then directed to the compound to be determined.

The mineral fiber products of the invention are suitable for high temperature applications, also with respect to thermal stability. In particular, mineral fiber products of the invention can be used for applications with maximum service temperatures of at least 600° C., preferably at least 650° C. Thus, the mineral fiber product of the invention generally satisfies the conditions for a Maximum Service Temperature (MST) of at least 600° C., preferably at least 650° C. according to the Maximum Service Temperature plate test of EN 14706:2012. The MST is not linked to the thermal degradation and off-gasses but is a mechanical strength.

In general, the uncured binder composition is an aqueous binder composition. In a preferred embodiment, the binders according to the present invention are formaldehyde free.

For the purpose of the present application, the term "formaldehyde free" is defined to characterize a mineral wool product where the emission is below 5 $\mu g/m^2/h$ of formaldehyde from the mineral wool product, preferably below 3 $\mu g/m^2/h$. Preferably, the test is carried out in accordance with ISO 16000 for testing aldehyde emissions.

The uncured binder composition for preparing of the mineral fibre product according to the present invention comprises one or more oxidized lignins as a component (i).

Component (i)

Component (i) is in form of one or more oxidized lignins.

Lignin, cellulose and hemicellulose are the three main organic compounds in a plant cell wall. Lignin can be thought of as the glue, that holds the cellulose fibres together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

FIG. 1 shows a section from a possible lignin structure.

There are at least four groups of technical lignins available in the market. These four groups are shown in FIG. 3. A possible fifth group, Biorefinery lignin, is a bit different as it is not described by the extraction process, but instead by the process origin, e.g. biorefining and it can thus be similar or different to any of the other groups mentioned. Each group is different from each other and each is suitable for different applications. Lignin is a complex, heterogenous material composed of up to three different phenyl propane monomers, depending on the source. Softwood lignins are made mostly with units of coniferyl alcohol, see FIG. 2 and as a result, they are more homogeneous than hardwood lignins, which has a higher content of syringyl alcohol, see FIG. 2. The appearance and consistency of lignin are quite variable and highly contingent on process.

A summary of the properties of these technical lignins is shown in FIG. 4.

Lignosulfonate from the sulfite pulping process remains the largest commercial available source of lignin, with capacity of 1.4 million tonnes. But taking these aside, the kraft process is currently the most used pulping process and is gradually replacing the sulfite process. An estimated 78 million tonnes per year of lignin are globally generated by kraft pulp production but most of it is burned for steam and energy. Current capacity for kraft recovery is estimated at 160,000 tonnes, but sources indicate that current recovery is only about 75,000 tonnes. Kraft lignin is developed from black liquour, the spent liquor from the sulfate or kraft process. At the moment, 3 well-known processes are used to produce the kraft lignin: LignoBoost, LignoForce and SLRP. These 3 processes are similar in that they involve the addition of $CO_2$ to reduce the pH to 9-10, followed by acidification to reduce pH further to approximately 2. The final step involves some combination of washing, leaching and filtration to remove ash and other contaminants. The three processes are in various stages of commercialization globally.

The kraft process introduces thiol groups, stilbene while some carbohydrates remain. Sodium sulphate is also present as an impurity due to precipitation of lignin from liquor with sulphuric acid but can potentially be avoided by altering the way lignin is isolated. The kraft process leads to high amount of phenolic hydroxyl groups and this lignin is soluble in water when these groups are ionized (above pH~10).

Commercial kraft lignin is generally higher in purity than lignosulfonates. The molecular weight are 1000-3000 g/mol·s Soda lignin originates from sodium hydroxide pulping processes, which are mainly used for wheat straw, bagasse and flax. Soda lignin properties are similar to kraft lignins one in terms of solubility and $T_g$. This process does not utilize sulphur and there is no covalently bound sulphur. The ash level is very low. Soda lignin has a low solubility in neutral and acid media but is completely soluble at pH 12 and higher.

The lignosulfonate process introduces large amount of sulphonate groups making the lignin soluble in water but also in acidic water solutions. Lignosulfonates has up to 8% sulfur as sulphonate, whereas kraft lignin has 1-2% sulfur, mostly bonded to the lignin. The molecular weight of lignosulfonate is 15.000-50.000 g/mol. This lignin contains more leftover carbohydrates compared to other types and has a higher average molecular weight. The typical hydrophobic core of lignin together with large number of ionized sulphonate groups make this lignin attractive as a surfactant and it often finds application in dispersing cement etc.

A further group of lignins becoming available is lignins resulting from biorefining processes in which the carbohydrates are separated from the lignin by chemical or biochemical processes to produce a carbohydrate rich fraction. This remaining lignin is referred to as biorefinery lignin. Biorefineries focus on producing energy, and producing substitutes for products obtained from fossil fuels and petrochemicals as well as lignin. The lignin from this process is in general considered a low value product or even a waste product mainly used for thermal combustion or used as low grade fodder or otherwise disposed of.

Organosolv lignin availability is still considered on the pilot scale. The process involves extraction of lignin by using water together with various organic solvents (most often ethanol) and some organic acids. An advantage of this process is the higher purity of the obtained lignin but at a much higher cost compared to other technical lignins and with the solubility in organic solvents and not in water.

Previous attempts to use lignin as a basic compound for binder compositions for mineral fibres failed because it proved difficult to find suitable cross-linkers which would achieve desirable mechanical properties of the cured mineral wool product and at the same time avoid harmful and/or corrosive components. Presently lignin is used to replace oil derived chemicals, such as phenol in phenolic resins in binder applications or in bitumen. It is also used as cement and concrete additives and in some aspects as dispersants.

The cross-linking of a polymer in general should provide improved properties like mechanical, chemical and thermal resistance etc. Lignin is especially abundant in phenolic and aliphatic hydroxyl groups that can be reacted leading to cross-linked structure of lignin. Different lignins will also have other functional groups available that can potentially be used. The existence of these other groups is largely dependent on the way lignin was separated from cellulose and hemicellulose (thiols in kraft lignin, sulfonates in lignosulfonate etc.) depending on the source.

It has been found that by using oxidized lignins, binder compositions for mineral fibres can be prepared which allow excellent properties of the mineral fibre product produced therewith and at the same time do not require components to be included into the binder compositions so that the mineral fibre product of the invention can be used in high temperature applications with low levels of ICA emission or even with no emission of ICA.

In one embodiment, the component (i) is in form of one or more oxidized kraft lignins.

In one embodiment, the component (i) is in form of one or more oxidized soda lignins.

In one embodiment, the component (i) is in form of one or more ammonia-oxidized lignins. For the purpose of the present invention, the term "ammonia-oxidized lignins" is to be understood as a lignin that has been oxidized by an oxidation agent in the presence of ammonia. The term "ammonia-oxidized lignin" is abbreviated as AOL.

In an alternative embodiment, the ammonia is partially or fully replaced by an alkali metal hydroxide, in particular sodium hydroxide and/or potassium hydroxide.

A typical oxidation agent used for preparing the oxidized lignins is hydrogen peroxide.

In one embodiment, the ammonia-oxidized lignin comprises one or more of the compounds selected from the group of ammonia, amines, hydroxides or any salts thereof.

In one embodiment, the component (i) is having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i).

In the binder composition, preferably the aqueous binder composition, used according to the present invention, component (i), i.e. the one or more oxidized lignins, may be present in an amount of 25 to 95 wt.-%, such as 30 to 90 wt.-%, such as 35 to 85 wt.-%, based on the dry weight of the binder composition.

In one embodiment, the component (i) is having an average carboxylic acid group content of more than 1.5 groups per macromolecule of component (i), such as more than 2 groups, such as more than 2.5 groups.

It is believed that the carboxylic acid group content of the oxidized lignins plays an important role in the surprising advantages of the aqueous binder compositions for mineral fibres according to the present invention. In particular, it is believed that the carboxylic acid group of the oxidized lignins improve the cross-linking properties and therefore allow better mechanical properties of the cured mineral fibre products.

In a preferred embodiment, the non-cured binder composition, which is preferably an aqueous binder composition, for preparing the mineral fibre product according to the present invention comprises

- a component (i) in form of one or more oxidized lignins;
- a component (ii) in form of one or more cross-linkers;
- optionally a component (iii) in form of one or more plasticizers.

Component (ii)

Optional component (ii) is in form of one or more cross-linkers.

In one embodiment, the component (ii) comprises in one embodiment one or more cross-linkers selected from β-hydroxyalkylamide-cross-linkers and/or oxazoline-cross-linkers.

The β-hydroxyalkylamide-cross-linker is a curing agent for the acid-functional macromolecules. It provides a hard, durable, corrosion resistant and solvent resistant cross-linked polymer network. It is believed the β-hydroxyalkylamide cross-linkers cure through esterification reaction to form multiple ester linkages. The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing crosslinkers can easily be obtained by polymerizing an oxazoline derivative. The U.S. Pat. No. 6,818,699 B2 provides a disclosure for such a process.

In one embodiment, the component (ii) is an epoxidised oil based on fatty acid triglyceride.

It is noted that epoxidised oils based on fatty acid triglycerides are not considered hazardous and therefore the use of these compounds in the binder compositions according to the present invention do not render these compositions unsafe to handle.

In one embodiment, the component (ii) is a molecule having 3 or more epoxy groups.

In one embodiment, the component (ii) is one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups.

In one embodiment, component (ii) is selected from the group consisting of cross-linkers taking part in a curing reaction, such as hydroxyalkylamide, alkanolamine, a reaction product of an alkanolamine and a polycarboxylic acid. The reaction product of an alkanolamine and a polycarboxylic acid can be found in U.S. Pat. No. 6,706,853B1.

Without wanting to be bound by any particular theory, it is believed that the very advantageous properties of the binder compositions, preferably the aqueous binder compositions, according to the present invention are due to the interaction of the oxidized lignins used as component (i) and the cross-linkers mentioned above. It is believed that the presence of carboxylic acid groups in the oxidized lignins enable the very effective cross-linking of the oxidized lignins.

In one embodiment, the component (ii) is one or more cross-linkers selected from the group consisting of multifunctional organic amines such as an alkanolamine, diamines, such as hexamethyldiamine, triamines.

In one embodiment, the component (ii) is one or more cross-linkers selected from the group consisting of polyethylene imine, polyvinyl amine, fatty amines.

In one embodiment, the component (ii) is one or more fatty amides.

In one embodiment, the component (ii) is one or more cross-linkers selected from the group consisting of dimethoxyethanal, glycolaldehyde, glyoxalic acid.

In one embodiment, the component (ii) is one or more cross-linkers selected from polyester polyols, such as polycaprolactone.

In one embodiment, the component (ii) is one or more cross-linkers selected from the group consisting of starch, modified starch, CMC.

In one embodiment, the component (ii) is one or more cross-linkers in form of aliphatic multifunctional carbodiimides;

In one embodiment, the component (ii) is one or more cross-linkers selected from melamine based cross-linkers, such as a hexakis(methylmethoxy)melamine (HMMM) based cross-linkers.

Examples of such compounds are Picassian XL 701, 702, 725 (Stahl Polymers), such as ZOLDINE® XL-29SE (Angus Chemical Company), such as CX300 (DSM), such as Carbodilite V-02-L2 (Nisshinbo Chemical Inc.).

In one embodiment, component (ii) is Primid XL552, which has the following structure:

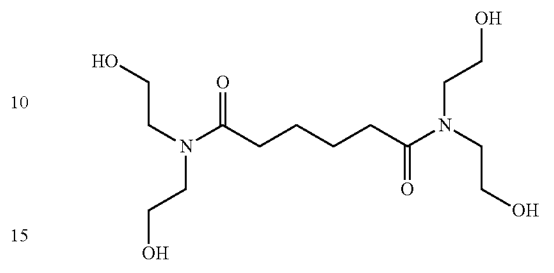

Primid XL-552

Component (ii) can also be any mixture of the above mentioned compounds.

In one embodiment, the binder composition according to the present invention comprises component (ii) in an amount of 1 to 40 wt.-%, such as 4 to 20 wt.-%, such as 6 to 12 wt.-%, based on the dry weight of component (i).

Component (iii)

Optional component (iii) is in form of one or more plasticizers.

In one embodiment, component (iii) is in form of one or more plasticizers selected from the group consisting of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

In one embodiment, component (iii) is in form of one or more plasticizers selected from the group consisting of carbonates, such as ethylene carbonate, propylene carbonate, lactones, lactams, lactides, compounds with a structure similar to lignin like vanillin, acetosyringone, solvents used as coalescing agents like alcohol ethers, polyvinyl alcohol.

In one embodiment, component (iii) is in form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferullic acid, polyurethane dispersions, acrylic based polymers with free carboxy groups, compounds with a structure similar to lignin like vanillin, acetosyringone.

In one embodiment, component (iii) is in form of one or more plasticizers selected from the group consisting of fatty alcohols, monohydroxy alcohols such as pentanol, stearyl alcohol.

In one embodiment, component (iii) comprises one or more plasticizers selected from the group consisting of polyethylene glycols, polyethylene glycol ethers.

Another particular surprising aspect of the present invention is that the use of plasticizers having a boiling point of more than 100° C., in particular 140 to 250° C., strongly improves the mechanical properties of the mineral fibre products according to the present invention although, in view of their boiling point, it is likely that these plasticizers will at least in part evaporate during the curing of the binders, preferably the aqueous binders, in contact with the mineral fibres.

In one embodiment, component (iii) comprises one or more plasticizers having a boiling point of more than 100° C., such as 110 to 280° C., more preferred 120 to 260° C., more preferred 140 to 250° C.

It is believed that the effectiveness of these plasticizers in the binder composition, preferably the aqueous binder composition used according to the present invention is associated with the effect of increasing the mobility of the oxidized lignins during the curing process. It is believed that the increased mobility of the lignins or oxidized lignins during the curing process facilitates the effective cross-linking.

In one embodiment, component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) comprises one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is selected from the group consisting of fatty alcohols, monohydroxy alcohols, such as pentanol, stearyl alcohol.

In one embodiment, component (iii) is selected from one or more plasticizers selected from the group consisting of alkoxylates such as ethoxylates such as butanol ethoxylates, such as butoxytriglycol.

In one embodiment, component (iii) is selected from one or more propylene glycols.

In one embodiment, component (iii) is selected from one or more glycol esters.

In one embodiment, component (iii) is selected from one or more plasticizers selected from the group consisting of adipates, acetates, benzoates, cyclobenzoates, citrates, stearates, sorbates, sebacates, azelates, butyrates, valerates.

In one embodiment, component (iii) is selected from one or more plasticizers selected from the group consisting of phenol derivatives such as alkyl or aryl substituted phenols.

In one embodiment, component (iii) is selected from one or more plasticizers selected from the group consisting of silanols, siloxanes.

In one embodiment, component (iii) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iii) is selected from one or more hydroxy acids.

In one embodiment, component (iii) is selected from one or more plasticizers selected from the group consisting of monomeric amides such as acetamides, benzamide, fatty acid amides such as tall oil amides.

In one embodiment, component (iii) is selected from one or more plasticizers selected from the group consisting of quaternary ammonium compounds such as trimethylglycine, distearyldimethylammoniumchloride.

In one embodiment, component (iii) is selected from one or more plasticizers selected from the group consisting of vegetable oils such as castor oil, palm oil, linseed oil, tall oil, soybean oil.

In one embodiment, component (iii) is in form of tall oil.

In one embodiment, component (iii) is selected from one or more plasticizers selected from the group consisting of hydrogenated oils, acetylated oils.

In one embodiment, component (iii) is selected from one or more fatty acid methyl esters.

In one embodiment, component (iii) is selected from one or more plasticizers selected from the group consisting of alkyl polyglucosides, gluconamides, aminoglucoseamides, sucrose esters, sorbitan esters.

It has surprisingly been found that the inclusion of plasticizers in the binder compositions, preferably the aqueous binder compositions, used according to the present invention strongly improves the mechanical properties of the mineral fibre products according to the present invention.

The term plasticizer refers to a substance that is added to a material in order to make the material softer, more flexible (by decreasing the glass-transition temperature Tg) and easier to process.

Component (iii) can also be any mixture of the above mentioned compounds.

In one embodiment, component (iii) is present in an amount of 0.5 to 50, preferably 2.5 to 25, more preferably 3 to 15 wt.-%, based on the dry weight of component (i).

Binder composition, preferably aqueous binder composition, for mineral fibers comprising components (i) and (iia)

In one embodiment the present invention is directed to a binder composition, preferably an aqueous binder composition, for mineral fibers comprising:

a component (i) in form of one or more oxidized lignins;

a component (iia) in form of one or more modifiers.

The present inventors have found that the excellent binder properties can also be achieved by a two-component system which comprises component (i) in form of one or more oxidized lignins and a component (iia) in form of one or more modifiers, and optionally any of the other components mentioned above and below.

In one embodiment, component (iia) is a modifier in form of one or more compounds selected from the group consisting of epoxidised oils based on fatty acid triglycerides.

In one embodiment, component (iia) is a modifier in form of one or more compounds selected from molecules having 3 or more epoxy groups.

In one embodiment, component (iia) is a modifier in form of one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups.

In one embodiment, component (iia) is one or more modifiers selected from the group consisting of polyethylene imine, polyvinyl amine, fatty amines.

In one embodiment, the component (iia) is one or more modifiers selected from aliphatic multifunctional carbodiimides.

Component (iia) can also be any mixture of the above mentioned compounds.

Without wanting to be bound by any particular theory, the present inventors believe that the excellent binder properties achieved by the binder composition for mineral fibers comprising components (i) and (iia), and optional further components, are at least partly due to the effect that the modifiers used as components (iia) at least partly serve the function of a plasticizer and a crosslinker.

In one embodiment, the binder composition, preferably the aqueous binder composition, comprises component (iia) in an amount of 1 to 40 wt.-%, such as 4 to 20 wt.-%, such as 6 to 12 wt.-%, based on the dry weight of the component (i).

Further Components

In some embodiments, the binder composition, preferably the aqueous binder composition, used according to the present invention comprises further components.

In one embodiment, the binder composition, preferably the aqueous binder composition, used according to the present invention comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid, and/or sodium polyphosphate (STTP), and/or sodium metaphosphate (STMP), and/or phosphorous oxychloride. The presence of such a catalyst can improve the curing properties of the binder composition, preferably the aqueous binder compositions, used according to the present invention.

In one embodiment, the binder composition, preferably the aqueous binder composition, used according to the present invention comprises a catalyst selected from Lewis acids, which can accept an electron pair from a donor compound forming a Lewis adduct, such as $ZnCl_2$, $Mg(ClO4)_2$, $Sn[N(SO_2\text{-n-}C8F17)_2]_4$.

In one embodiment, the binder composition, preferably the aqueous binder composition, used according to the present invention comprises a catalyst selected from metal chlorides, such as KCl, $MgCl_2$, $ZnCl_2$, $FeCl_3$ and $SnCl_2$.

In one embodiment, the binder composition, preferably the aqueous binder composition, used according to the present invention comprises a catalyst selected from organometallic compounds, such as titanate-based catalysts and stannum based catalysts.

In one embodiment, the binder composition, preferably the aqueous binder composition, used according to the present invention comprises a catalyst selected from chelating agents, such as transition metals, such as iron ions, chromium ions, manganese ions, copper ions.

In one embodiment, the binder composition, preferably the aqueous binder composition, used according to the present invention further comprises a further component (iv) in form of one or more silanes.

In one embodiment, the binder composition, preferably the aqueous binder composition, used according to the present invention comprises a further component (iv) in form of one or more coupling agents, such as organofunctional silanes.

In one embodiment, component (iv) is selected from group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea funtionalised silanes or vinyl functionalized silanes.

In one embodiment, the binder composition, preferably the aqueous binder composition, used according to the present invention further comprises a component (v) in form of one or more components selected from the group of ammonia, amines or any salts thereof.

It has been found that the inclusion of ammonia, amines or any salts thereof as a further component can in particular be useful when oxidized lignins are used in component (i), which oxidised lignin have not been oxidized in the presence of ammonia.

In one embodiment, the binder composition, preferably the aqueous binder composition, used according to the present invention further comprises a further component in form of urea, in particular in an amount of 5 to 40 wt.-%, such as 10 to 30 wt.-%, 15 to 25 wt.-%, based on the dry weight of component (i).

In one embodiment, the binder composition, preferably the aqueous binder composition, used according to the present invention further comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99.

In one embodiment, the binder composition, preferably the aqueous binder composition, used according to the present invention further comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In the context of the present invention, a binder composition having a sugar content of 50 wt.-% or more, based on the total dry weight of the binder components, is considered to be a sugar based binder. In the context of the present invention, a binder composition having a sugar content of less than 50 wt.-%, based on the total dry weight of the binder components, is considered a non-sugar based binder.

In one embodiment, the binder composition, preferably the aqueous adhesive composition, used according to the present invention further comprises a further component in form of one or more surface active agents that are in the form of non-ionic and/or ionic emulsifiers such as polyoxyethylenes (4) lauryl ether, such as soy lecithin, such as sodium dodecyl sulfate.

In one embodiment, the binder composition, preferably the aqueous binder composition, used according to the present invention comprises

- a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
- a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines;

a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the binder composition, preferably the aqueous binder composition, comprises component (ii) in an amount of 1 to 40 wt.-%, such as 4 to 20 wt.-%, 6 to 12 wt.-%, based on the dry weight of component (i), and (iii) is present in an amount of 0.5 to 50, preferably 2.5 to 25, more preferably 3 to 15 wt.-%, based on the dry weight of component (i).

In one embodiment, the binder composition, preferably the aqueous binder composition, used according to the present invention comprises

- a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
- a component (iia) in form of one or more modifiers selected from epoxidised oils based on fatty acid triglycerides.

In one embodiment, the binder composition, preferably the aqueous binder composition, used according to the present invention comprises

- a component (i) in form of one or more ammonia-oxidized lignins having an average carboxylic acid group content of more than 1.5 groups per macromolecule of component (i), such as more than 2 groups, such as more than 2.5 groups;
- a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines;
- a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the binder composition, preferably the aqueous binder composition, comprises component (ii) in an amount of 1 to 40 wt.-%, such as 4 to 20 wt.-%, 6 to 12 wt.-%, based on the dry weight of component (i), and (iii) is present in an amount of 0.5 to 50, preferably 2.5 to 25, more preferably 3 to 15 wt.-%, based on the dry weight of component (i).

In one embodiment, the binder composition, preferably the aqueous binder composition, used according to the present invention comprises

- a component (i) in form of one or more ammonia-oxidized lignins having an average carboxylic acid group content of more than 1.5 groups per macromolecule of component (i), such as more than 2 groups, such as more than 2.5 groups;
- a component (iia) in form of one or more modifiers selected from epoxidised oils based on fatty acid triglycerides.

In one embodiment, the binder composition, preferably the aqueous binder composition, used according to the present invention consists essentially of

- a component (i) in form of one or more oxidized lignins;
- a component (ii) in form of one or more cross-linkers;
- a component (iii) in form of one or more plasticizers;
- a component (iv) in form of one or more coupling agents, such as organofunctional silanes;
- optionally a component in form of one or more compounds selected from the group of ammonia, amines or any salts thereof;
- optionally a component in form of urea;
- optionally a component in form of a more reactive or non-reactive silicones;
- optionally a hydrocarbon oil;
- optionally one or more surface active agents;
- water.

In one embodiment, the binder composition, preferably the aqueous binder composition, used according to the present invention consists essentially of

- a component (i) in form of one or more oxidized lignins;
  - a component (iia) in form of one or more modifiers selected from epoxidised oils based on fatty acid triglycerides;
  - a component (iv) in form of one or more coupling agents, such as organofunctional silanes;
  - optionally a component in form of one or more compounds selected from the group of ammonia, amines or any salts thereof;
  - optionally a component in form of urea;
  - optionally a component in form of a more reactive or non-reactive silicones;
  - optionally a hydrocarbon oil;
  - optionally one or more surface active agents;
  - water.

A Method for Producing a Mineral Fibre Product

The mineral fibre product of the present invention is prepared by a common method for producing a mineral fibre product by binding mineral fibres with the binder composition. Accordingly, the mineral fibre product of the present invention is preferably prepared by a method which comprises the steps of contacting mineral fibres with an uncured and preferably aqueous binder composition comprising one or more oxidized lignins. In a preferred embodiment, the uncured and preferably aqueous binder composition comprises

- a component (i) in form of one or more oxidized lignins;
- a component (ii) in form of one or more cross-linkers;
- optionally a component (iii) in form of one or more plasticizers.

Curing

The uncured binder composition in mineral fiber product precursor such as a web where the mineral fibers are in contact with the binder composition is cured by a chemical and/or physical reaction of the binder components.

In one embodiment, the curing takes place in a curing device.

In one embodiment, the curing is carried out at temperatures from 100 to 300° C., such as 170 to 270° C., such as 180 to 250° C., such as 190 to 230° C.

In one embodiment, the curing takes place in a conventional curing oven for mineral wool production operating at a temperature of from 150 to 300° C., such as 170 to 270° C., such as 180 to 250° C., such as 190 to 230° C.

In one embodiment, the curing takes place for a time of 30 seconds to 20 minutes, such as 1 to 15 minutes, such as 2 to 10 minutes.

In a typical embodiment, curing takes place at a temperature of 150 to 250° C. for a time of 30 seconds to 20 minutes.

The curing process may commence immediately after application of the binder to the fibres. The curing is defined as a process whereby the binder composition undergoes a physical and/or chemical reaction which in case of a chemical reaction usually increases the molecular weight of the compounds in the binder composition and thereby increases the viscosity of the binder composition, usually until the binder composition reaches a solid state.

In one embodiment the curing process comprises drying by pressure. The pressure may be applied by blowing air or gas through/over the mixture of mineral fibres and binder.

Mineral Fibre Product According to the Present Invention

The present invention is directed to a mineral fibre product comprising mineral fibres in contact with a cured binder composition as described above, i.e. in contact with a cured binder resulting from the curing of the binder composition, preferably aqueous binder composition, described above.

The mineral fibres employed may be any of man-made vitreous fibres (MMVF), glass fibres, ceramic fibres, basalt fibres, slag fibres, rock fibres, stone fibres and others. These fibres may be present as a wool product, e.g. like a stone wool product.

Fibre/Melt Composition

The man-made vitreous fibres (MMVF) can have any suitable oxide composition. The fibres can be glass fibres, ceramic fibres, basalt fibres, slag fibres or rock or stone fibres. The fibres are preferably of the types generally known as rock, stone or slag fibres, most preferably stone fibres.

Stone fibres commonly comprise the following oxides, in percent by weight:

$SiO_2$: 30 to 51
CaO: 8 to 30
MgO: 2 to 25
FeO (including $Fe_2O_3$): 2 to 15
$Na_2O+K_2O$: not more than 10
CaO+MgO: 10 to 30

In preferred embodiments the MMVF have the following levels of elements, calculated as oxides in wt %:

$SiO_2$: at least 30, 32, 35 or 37; not more than 51, 48, 45 or 43
$Al_2O_3$: at least 12, 16 or 17; not more than 30, 27 or 25
CaO: at least 8 or 10; not more than 30, 25 or 20
MgO: at least 2 or 5; not more than 25, 20 or 15
FeO (including Fe2O3): at least 4 or 5; not more than 15, 12 or 10
FeO+MgO: at least 10, 12 or 15; not more than 30, 25 or 20
$Na_2O+K_2O$: zero or at least 1; not more than 10
CaO+MgO: at least 10 or 15; not more than 30 or 25
$TiO_2$: zero or at least 1; not more than 6, 4 or 2
$TiO_2$+FeO: at least 4 or 6; not more than 18 or 12
$B_2O_3$: zero or at least 1; not more than 5 or 3
$P_2O_5$: zero or at least 1; not more than 8 or 5
Others: zero or at least 1; not more than 8 or 5

The MMVF made by the method of the invention preferably have the composition in wt %:

| | |
|---|---|
| $SiO_2$ | 35 to 50 |
| $Al_2O_3$ | 12 to 30 |
| $TiO_2$ | up to 2 |
| $Fe_2O_3$ | 3 to 12 |
| CaO | 5 to 30 |
| MgO | up to 15 |

-continued

| | |
|---|---|
| $Na_2O$ | 0 to 15 |
| $K_2O$ | 0 to 15 |
| $P_2O_5$ | up to 3 |
| MnO | up to 3 |
| $B_2O_3$ | up to 3 |

Another preferred composition for the MMVF is as follows in wt %:

$SiO_2$ 39-55% preferably 39-52%
$Al_2O_3$16-27% preferably 16-26%
CaO 6-20% preferably 8-18%
MgO 1-5% preferably 1-4.9%
$Na_2O$ 0-15% preferably 2-12%
$K_2O$ 0-15% preferably 2-12%
$R_2O$ ($Na_2O+K_2O$) 10-14.7% preferably 10-13.5%
$P_2O_5$ 0-3% preferably 0-2%
$Fe_2O_3$ (iron total) 3-15% preferably 3.2-8%
$B_2O_3$ 0-2% preferably 0-1%
$TiO_2$ 0-2% preferably 0.4-1%
Others 0-2.0%

Glass fibres commonly comprise the following oxides, in percent by weight:

$SiO_2$: 50 to 70
$Al_2O_3$: 10 to 30
CaO: not more than 27
MgO: not more than 12

Glass fibres can also contain the following oxides, in percent by weight:

$Na_2O+K_2O$: 8 to 18, in particular $Na_2O+K_2O$ greater than CaO+MgO
$B_2O_3$: 3 to 12

Some glass fibre compositions can contain $Al_2O_3$: less than 2%.

Suitable fibre formation methods and subsequent production steps for manufacturing the mineral fibre product are those conventional in the art. Generally, the binder is sprayed immediately after fibrillation of the mineral melt on to the air-borne mineral fibres. The uncured and preferably aqueous binder composition is normally applied in an amount of 0.1 to 18%, preferably 0.2 to 8% by weight, of the bonded mineral fibre product on a dry basis.

The spray-coated mineral fibre web is generally cured in a curing oven by means of a hot air stream. The hot air stream may be introduced into the mineral fibre web from below, or above or from alternating directions in distinctive zones in the length direction of the curing oven.

Typically, the curing oven is operated at a temperature of from about 150° C. to about 300° C., such as 170 to 270° C., such as 180 to 250° C., such as 190 to 230° C. Generally, the curing oven residence time is from 30 seconds to 20 minutes, such as 1 to 15 minutes, such as 2 to 10 minutes, depending on, for instance, the product density.

In a typical embodiment, the mineral fiber product according to the present invention is cured at a temperature of 150° C. to 250° C. for a time of 30 seconds to 20 minutes.

If desired, the mineral fibre web may be subjected to a shaping process before curing. The bonded mineral fibre product emerging from the curing oven may be cut to a desired format e.g., in the form of a batt.

In a preferred embodiment, the mineral fiber product according to the present invention is a thermal isolation product. The mineral fiber product is preferably in form of a preformed pipe section, a wired mat or a slab.

In a preferred embodiment, the mineral fiber product according to the present has a thickness in the range of 20 mm to 500 mm, preferably 30 mm to 300 mm, such as 50 mm to 150 mm, wherein in general the mineral fibre product is in form of a sheet.

The mineral fibre products according to the present invention generally have a density within the range of from 6 to 250 kg/$m^3$, preferably 20 to 200 kg/$m^3$. The mineral fibre products generally have a loss on ignition (LOI) within the range of 0.25 to 18.0% or 0.3 to 18.0%, preferably 0.5 to 8.0%. In a preferred embodiment, the mineral fibre product has a loss on ignition (LOI) of 0.25 to 8.0% or 0.3 to 8.0%, more preferably 0.25 to 6.0%.

Use of the Mineral Fibre Product According to the Present Invention

A use according to the present invention of a mineral fibre product is directed to a high temperature application. A high temperature application here means the use of the mineral fibre product at a temperature of at least 300° C., preferably, at least 400° C., such as at least 450° C. and/or up to 700° C.

Accordingly, the invention also relates to a use of a mineral fibre product, comprising mineral fibres bound by a cured binder composition, the non-cured binder composition comprising one or more oxidized lignins, at a temperature of at least 300° C., preferably at least 400° C. such as at least 450° C. In general, the inventive use is at a temperature of not more than 700° C., preferably not more than 650° C.

In general, it is preferred that heating of the mineral fibre product to a temperature of 600° C. off-gases less than 1000 μg isocyanic acid (ICA) per gram of sample, more preferably less than 750 μg isocyanic acid (ICA) per gram of sample, such as less than 500 μg isocyanic acid (ICA) per gram of sample, such as less than 250 μg isocyanic acid (ICA) per gram of sample, such as less than 100 μg isocyanic acid (ICA) per gram of sample. The method for determining the total ICA emission is described below.

In a preferred embodiment of the use according to the invention, the mineral fibre product is used as a thermal insulation product, more preferably as a thermal pipe insulation.

With respective to the inventive use, it is preferred that the pipe is operated at high use temperatures of at least 300° C., preferably at least 400° C., such as at least 450° C. In general, the temperature is not more than 700° C., preferably not more than 650° C.

The pipe is preferably a metal pipe. In particular, the pipe is used to transport a medium, such as a gas, a steam or a fluid. The medium transported through the pipe is usually a high temperature medium having the minimum use temperature described above.

The mineral fiber product for the use according to the invention can have all features which have been described above for the inventive mineral fiber product so that reference is made thereto.

Method of Transporting a Medium According to the Present Invention

The invention also relates to a method for transporting a medium, comprising the steps of a) covering a pipe with a mineral fibre product as a thermal pipe insulation, and b) transporting the medium through the pipe, wherein the mineral fibre product comprises mineral fibres bound by a cured binder composition, the non-cured binder composition comprising one or more oxidized lignins.

In general, it is preferred that heating of the mineral fibre product to a temperature of 600° C. off-gases less than 1000 μg isocyanic acid (ICA) per gram of sample, such as less than 750 μg isocyanic acid (ICA) per gram of sample, such as less than 500 μg isocyanic acid (ICA) per gram of sample, such as less than 250 μg isocyanic acid (ICA) per gram of sample, such as less than 100 μg isocyanic acid (ICA) per gram of sample. The method for determining the total ICA emission is described below.

In a preferred embodiment, the medium transported has a temperature of at least 300° C., preferably at least 400° C., such as at least 450° C. Preferably, the temperature is not more than 700° C., preferably not more than 650° C.

The medium transported through the pipe may be for instance a gas, a steam or a fluid.

The mineral fiber product used in the method according to the invention can have all features which have been described above for the inventive mineral fiber product so that reference is made thereto.

Pipe with Thermal Insulation According to the Present Invention

The invention also relates to a pipe covered or wrapped with a mineral fibre product as a thermal insulation, wherein the mineral fibre product comprises mineral fibres bound by a cured binder composition, the non-cured binder composition comprising one or more oxidized lignins.

In general, it is preferred that heating of the mineral fibre product to a temperature of 600° C. off-gases less than 1000 μg isocyanic acid (ICA) per gram of sample, such as less than 750 μg isocyanic acid (ICA) per gram of sample, such as less than 500 μg isocyanic acid (ICA) per gram of sample, such as less than 250 μg isocyanic acid (ICA) per gram of sample, such as less than 100 μg isocyanic acid (ICA) per gram of sample. The method for determining the total ICA emission is described below.

The mineral fiber product for covering the pipe according to the invention can have all features which have been described above for the inventive mineral fiber product so that reference is made thereto.

Oxidised Lignins which can be Used as Component in the Binder Composition, Preferably Aqueous Binder Composition for Mineral Fibres According to the Present Invention for Both Alternative a and Alternative B Described Above and Method for Preparing Such Oxidised Lignins.

In the following, we describe oxidised lignins which can be used as component of the binder composition and their preparation.

Method I to Prepare Oxidised Lignins

Oxidised lignins, which can be used as component for the binders used in the present invention can be prepared by a method comprising bringing into contact a component (a) comprising one or more lignins a component (b) comprising ammonia, one or more amine components, and/or any salt thereof.

a component (c) comprising one or more oxidation agents.

Component (a)

Component (a) comprises one or more lignins.

In one embodiment of the method according to the present invention, component (a) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (a) comprises one or more kraft lignins.

Component (b)

In one embodiment according to the present invention, component (b) comprises ammonia, one or more amino components, and/or any salts thereof. Without wanting to be bound by any particular theory, the present inventors believe that replacement of the alkali hydroxides used in previously known oxidation processes of lignin by ammonia, one or more amino components, and/or any salts thereof, plays an important role in the improved properties of the oxidised lignins prepared according to the method of the present invention.

The present inventors have surprisingly found that the lignins oxidised by an oxidation agent in the presence of ammonia or amines contain significant amounts of nitrogen as a part of the structure of the oxidised lignins. Without wanting to be bound to any particular theory, the present inventors believe that the improved fire resistance properties of the oxidised lignins when used in products where they are comprised in a binder composition, said oxidised lignins prepared by the method according to the present invention, are at least partly due to the nitrogen content of the structure of the oxidised lignins.

In one embodiment, component (b) comprises ammonia and/or any salt thereof.

Without wanting to be bound by any particular theory, the present inventors believe that the improved stability properties of the derivatized lignins prepared according to the present invention are at least partly due to the fact that ammonia is a volatile compound and therefore evaporates from the final product or can be easily removed and reused. In contrast to that, it has proven difficult to remove residual amounts of the alkali hydroxides used in the previously known oxidation process.

Nevertheless, it can be advantageous in the method according to the present invention that component (b), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (b) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (c)

In the method according to the present invention, component (c) comprises one or more oxidation agents.

In one embodiment, component (c) comprises one or more oxidation agents in form of hydrogen peroxide, organic or inorganic peroxides, molecular oxygen, ozone, air, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (c) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

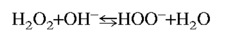

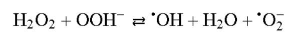

The present inventors have found that the derivatized lignins prepared with the method according to the present invention contain increased amounts of carboxylic acid groups as a result of the oxidation process. Without wanting to be bound by any particular theory, the present inventors believe that the carboxylic acid group content of the oxidised lignins prepared in the process according to the present invention plays an important role in the desirable reactivity properties of the derivatized lignins prepared by the method according to the present invention.

Another advantage of the oxidation process is that the oxidised lignin is more hydrophilic. Higher hydrophilicity can enhance solubility in water and facilitate the adhesion to polar substrates such as mineral fibers.

Further Components

In one embodiment, the method according to the present invention comprises further components, in particular a component (d) in form of an oxidation catalyst, such as one or more transition metal catalyst, such as iron sulfate, such as manganese, palladium, selenium, tungsten containing catalysts.

Such oxidation catalysts can increase the rate of the reaction, thereby improving the properties of the oxidised lignins prepared by the method according to the present invention.

Mass Ratios of the Components

The person skilled in the art will use the components (a), (b) and (c) in relative amounts that the desired degree of oxidation of the lignins is achieved.

In one embodiment,

- a component (a) comprises one or more lignins
- a component (b) comprises ammonia
- a component (c) comprises one or more oxidation agents in form of hydrogen peroxide, wherein the mass ratios of lignin, ammonia and hydrogen peroxide are such that the amount of ammonia is 0.01 to 0.5 weight parts, such as 0.1 to 0.3, such as 0.15 to 0.25 weight parts ammonia, based on the dry weight of lignin, and wherein the amount of hydrogen peroxide is 0.025 to 1.0 weight parts, such as 0.05 to 0.2 weight parts, such as 0.075 to 0.125 weight parts hydrogen peroxide, based on the dry weight of lignin.

Process

There is more than one possibility to bring the components (a), (b) and (c) in contact to achieve the desired oxidation reaction.

In one embodiment, the method comprises the steps of:

- a step of providing component (a) in form of an aqueous solution and/or dispersion of one more lignins, the lignin content of the aqueous solution being 1 to 50 weight-%, such as 5 to 25 weight-%, such as 15 to 22 weight-%, such as 18 to 20 weight-%, based on the total weight of the aqueous solution;
- a pH adjusting step by adding component (b) comprising an aqueous solution of ammonia, one or more amine components, and/or any salt thereof;

an oxidation step by adding component (c) comprising an oxidation agent.

In one embodiment, the pH adjusting step is carried so that the resulting aqueous solution and/or dispersion is having a pH ≥9, such as ≥10, such as ≥10.5.

In one embodiment, the pH adjusting step is carried out so that the resulting aqueous solution and/or dispersion is having a pH in the range of 10.5 to 12.

In one embodiment, the pH adjusting step is carried out so that the temperature is allowed to raise to ≥25° C. and then controlled in the range of 25-50° C., such as 30-45° C., such as 35-40° C.

In one embodiment, during the oxidation step, the temperature is allowed to raise ≥35° C. and is then controlled in the range of 35-150° C., such as 40-90° C., such as 45-80° C.

In one embodiment, the oxidation step is carried out for a time of 1 second to 48 hours, such as 10 seconds to 36 hours, such as 1 minute to 24 hours such as 2-5 hours.

Method II to Prepare Oxidised Lignins

Oxidised lignins, which can be used as component for the binders used in the present invention can be prepared by a method comprising bringing into contact

- a component (a) comprising one or more lignins
- a component (b) comprising ammonia and/or one or more amine components, and/or any salt thereof and/or an alkali and/or earth alkali metal hydroxide, such as sodium hydroxide and/or potassium hydroxide
- a component (c) comprising one or more oxidation agents
- a component (d) in form of one or more plasticizers.

Component (a)

Component (a) comprises one or more lignins.

In one embodiment of the method according to the present invention, component (a) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (a) comprises one or more kraft lignins.

Component (b)

In one embodiment according to the present invention, component (b) comprises ammonia, one or more amino components, and/or any salts thereof and/or an alkali and/or earth alkali metal hydroxide, such as sodium hydroxide and/or potassium hydroxide.

"Ammonia-oxidized lignins" is to be understood as a lignin that has been oxidized by an oxidation agent in the presence of ammonia. The term "ammonia-oxidized lignin" is abbreviated as AOL.

In one embodiment, component (b) comprises ammonia and/or any salt thereof.

Without wanting to be bound by any particular theory, the present inventors believe that the improved stability properties of the derivatized lignins prepared according to the present invention with component (b) being ammonia and/or any salt thereof are at least partly due to the fact that ammonia is a volatile compound and therefore evaporates from the final product or can be easily removed and reused.

Nevertheless, it can be advantageous in this embodiment of the method according to the present invention that component (b), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (b) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (c)

In the method according to the present invention, component (c) comprises one or more oxidation agents.

In one embodiment, component (c) comprises one or more oxidation agents in form of hydrogen peroxide, organic or inorganic peroxides, molecular oxygen, ozone, air, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism, multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (c) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

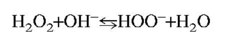

$$H_2O_2 + OH^- \leftrightarrows HOO^- + H_2O$$

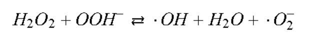

$$H_2O_2 + OOH^- \rightleftarrows \cdot OH + H_2O + \cdot O_2^-$$

The present inventors have found that the derivatized lignins prepared with the method according to the present invention contain increased amounts of carboxylic acid groups as a result of the oxidation process. Without wanting to be bound by any particular theory, the present inventors believe that the carboxylic acid group content of the oxidized lignins prepared in the process according to the present invention plays an important role in the desirable reactivity properties of the derivatized lignins prepared by the method according to the present invention.

Another advantage of the oxidation process is that the oxidized lignin is more hydrophilic. Higher hydrophilicity can enhance solubility in water and facilitate the adhesion to polar substrates such as mineral fibres.

Component (d)

Component (d) comprises one or more plasticizers.

In one embodiment according to the present invention, component (d) comprises one or more plasticizers in form of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

The present inventors have found that the inclusion of component (d) in form of one or more plasticizers provides a decrease of the viscosity of the reaction mixture which allows a very efficient method to produce oxidised lignins.

In one embodiment according to the present invention, component (d) comprises one or more plasticizers in form of polyols, such as carbohydrates, hydrogenated sugars, such as sorbitol, erythriol, glycerol, monoethylene glycol, polyethylene glycols, polyvinyl alcohol, acrylic based polymers with free carboxy groups and/or polyurethane dispersions with free carboxy groups, polyamides, amides such as carbamide/urea, or any mixtures thereof.

In one embodiment according to the present invention, component (d) comprises one or more plasticizers selected from the group of polyethylene glycols, polyvinyl alcohol, urea or any mixtures thereof.

Further Components

In one embodiment, the method according to the present invention comprises further components, in particular a component (v) in form of an oxidation catalyst, such as one or more transition metal catalyst, such as iron sulfate, such as manganese, palladium, selenium, tungsten containing catalysts.

Such oxidation catalysts can increase the rate of the reaction, thereby improving the properties of the oxidized lignins prepared by the method.

Mass Ratios of the Components

The person skilled in the art will use the components (a), (b), (c), and (d) in relative amounts that the desired degree of oxidation of the lignins is achieved.

In one embodiment, the method according to the present invention is carried out such that the method comprises

- a component (a) comprises one or more lignins
- a component (b) comprises ammonia
- a component (c) comprises one more oxidation agents in form of hydrogen peroxide,
- a component (d) comprises one or more plasticizers selected from the group of polyethylene glycol,
- wherein the mass ratios of lignin, ammonia, hydrogen peroxide and polyethylene glycol are such that the amount of ammonia is 0.01 to 0.5 weight parts, such as 0.1 to 0.3, such as 0.15 to 0.25 weight parts ammonia (25 weight % solution in water), based on the dry weight of lignin, and wherein the amount of hydrogen peroxide (30 weight % solution in water) is 0.025 to 1.0 weight parts, such as 0.07 to 0.50 weight parts, such as 0.15 to 0.30 weight parts hydrogen peroxide, based on the dry weight of lignin, and wherein the amount of polyethylene glycol is 0.03 to 0.60 weight parts, such as 0.07 to 0.50 weight parts, such as 0.10 to 0.40 weight parts polyethylene glycol, based on the dry weight of lignin.

For the purpose of the present invention, the "dry weight of lignin" is preferably defined as the weight of the lignin in the supplied form.

Process

There is more than one possibility to bring the components (a), (b), (c), and (d) in contact to achieve the desired oxidation reaction.

In one embodiment, the method comprises the steps of:

- a step of providing component (a) in form of an aqueous solution and/or dispersion of one more lignins, the lignin content of the aqueous solution being 5 to 90 weight-%, such as 10 to 85 weight-%, such as 15 to 70 weight-%, based on the total weight of the aqueous solution;
- a pH adjusting step by adding component (b);
- a step of adding component (d);
- an oxidation step by adding component (c) comprising an oxidation agent.

In one embodiment, the pH adjusting step is carried so that the resulting aqueous solution and/or dispersion is having a pH ≥9, such as ≥10, such as ≥10.5.

In one embodiment, the pH adjusting step is carried out so that the resulting aqueous solution and/or dispersion is having a pH in the range of 9.5 to 12.

In one embodiment, the pH adjusting step is carried out so that the temperature is allowed to raise to ≥25° C. and then controlled in the range of 25-50° C., such as 30-45° C., such as 35-40° C.

In one embodiment, during the oxidation step, the temperature is allowed to raise to ≥35° C. and is then controlled in the range of 35-150° C., such as 40-90° C., such as 45-80° C.

In one embodiment, the oxidation step is carried out for a time of 1 seconds to 24 hours, such as 1 minutes to 12 hours, such as 10 minutes to 8 hours, such as 5 minutes to 1 hour.

The present inventors have found that the process according to the present invention allows to produce a high dry matter content of the reaction mixture and therefore a high throughput is possible in the process according to the present invention which allows the reaction product in form of the oxidised lignins to be used as a component in industrial mass production products such as mineral fibre products.

In one embodiment, the method according to the present invention is carried out such that the dry matter content of the reaction mixture is 20 to 80 wt. %, such as 40 to 70 wt. %.

In one embodiment, the method according to the present invention is carried out such that the viscosity of the oxidised lignin has a value of 100 cP to 100.000 cP, such as a value of 500 cP to 50.000 cP, such as a value of 1.000 cP to 25.000 cP.

For the purpose of the present invention, viscosity is dynamic viscosity and is defined as the resistance of the liquid/paste to a change in shape, or movement of neighbouring portions relative to one another. The viscosity is measured in centipoise (cP), which is the equivalent of 1 mPa s (milipascal second). Viscosity is measured at 20° C. using a viscometer. For the purpose of the present invention, the dynamic viscosity can be measured at 20° C. by a Cone Plate Wells Brookfield Viscometer.

In one embodiment, the method according to the present invention is carried out such that the method comprises a rotator-stator device.

In one embodiment, the method according to the present invention is carried out such that the method is performed as a continuous or semi-continuous process.

Apparatus for Performing the Method

The present invention is also directed to an apparatus for performing the method described above.

In one embodiment, the apparatus for performing the method comprises:

- a rotor-stator device,
- a premixing device for component (a), (b), (d)
- one or more inlets for water, components (a), (b), (c) and (d),
- one or more outlets for an oxidised lignin.

In one embodiment, the apparatus is constructed in such a way that the inlets for the premix of the components (a), (b) and (d) are to the rotor-stator device and the apparatus furthermore comprises a chamber, said chamber having an inlet for component (c) and said chamber having an outlet for an oxidised lignin.

A rotator-stator device is a device for processing materials comprising a stator configured as an inner cone provided with gear rings. The stator cooperates with a rotor having arms projecting from a hub. Each of these arms bears teeth meshing with the teeth of the gear rings of the stator. With each turn of the rotor, the material to be processed is transported farther outward by one stage, while being subjected to an intensive shear effect, mixing and redistribution. The rotor arm and the subjacent container chamber of the upright device allow for a permanent rearrangement of the material from the inside to the outside and provide for a multiple processing of dry and/or highly viscous matter so that the device is of excellent utility for the intensive mixing, kneading, fibrillating, disintegrating and similar processes important in industrial production. The upright arrangement of the housing facilitates the material's falling back from the periphery toward the center of the device.

In one embodiment, the rotator-stator device used in the method according to the present invention comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the center.

For more details of the rotator-stator device to be used in one embodiment of the method, reference is made to US 2003/0042344 A1, which is incorporated by reference.

In one embodiment, the method is carried out such that the method uses one rotator-stator device. In this embodiment, the mixing of the components and the reaction of the components is carried out in the same rotator-stator device.

In one embodiment, the method is carried out such that the method uses two or more rotator-stator devices, wherein at least one rotator-stator device is used for the mixing of the components and at least one rotator-stator device is used for reacting the components.

This process can be divided into two steps:

1. Preparation of the Lignin mass (a)+(b)+(d)
2. Oxidization of the lignin mass

Typically, two different types of rotor-/stator machines are used:

1. Open rotor-/stator machine suitable for blending in the lignin powder into water on a very high concentration (30 to 50 wt-%). Less intensive mixing but special auxiliaries (inlet funnel, screw etc.) to handle highly viscous materials. Lower circumferential speed (up to 15 m/s). The machine can be used as batch system or continuous.
2. Inline rotor-/stator machine which has much higher shear forces—circumferential speeds of up to 55 m/s)—and creates beneficial conditions for a very quick chemical reaction. The machine is to be used continuously.

In the open rotor-/stator system the highly concentrated (45 to 50 wt-%) mass of Lignin/water is prepared. The lignin powder is added slowly to the warm water (30 to 60° C.) in which the correct amount of watery ammonia and/or alkali base have been added. This can be done in batch mode, or the materials are added intermittently/continuously creating a continuous flow of mass to the next step.

The created mass should be kept at a temperature of about 60 deg. to keep the viscosity as low as possible and hence the material pumpable. The hot mass of lignin/water at a pH of 9 to 12 is then transferred using a suitable pump, e.g. progressive cavity pump or another volumetric pump, to the oxidation step.

In on embodiment the oxidation is done in a closed rotor-/stator system in a continuous inline reaction. A watery solution of ammonia and/or alkali base is dosed with a dosing pump into the rotor-/stator chamber at the point of highest turbulence/shear. This ensures a rapid oxidation reaction. The oxidized material (AOL) leaves the inline-reactor and is collected in suitable tanks.

Reaction Product

The present inventors have surprisingly found, that the oxidized lignins prepared have very desirable reactivity properties and at the same time display improved fire resistance properties when used in products where they are comprised in a binder composition, and improved long term stability over previously known oxidized lignins.

The oxidised lignin also displays improved hydrophilicity.

An important parameter for the reactivity of the oxidized lignins prepared is the carboxylic acid group content of the oxidized lignins.

In one embodiment, the oxidized lignin prepared has a carboxylic acid group content of 0.05 to 10 mmol/g, such as 0.1 to 5 mmol/g, such as 0.20 to 2.0 mmol/g, such as 0.40 to 1.5 mmol/g, such as 0.45 to 1.0 mmol/g, based on the dry weight of component (a).

Another way to describe the carboxylic acid group content is by using average carboxylic acid group content per lignin macromolecule according to the following formula:

$$\text{Average COOH functionality} = \frac{\text{total moles COOH}}{\text{total moles lignin}}$$

In one embodiment, the oxidized lignin prepared has an average carboxylic acid group content of more than 1.5 groups per macromolecule of component (a), such as more than 2 groups, such as more than 2.5 groups.

Method III to Prepare Oxidised Lignins

Oxidised lignins, which can be used as a component for the binder used in the present invention can be prepared by a method comprising bringing into contact a component (a) comprising one or more lignins, a component (b) comprising ammonia and/or one or more amine components, and/or any salt thereof and/or an alkali and/or earth alkali metal hydroxide, such as sodium hydroxide and/or potassium hydroxide, a component (c) comprising one or more oxidation agents, optionally a component (d) in form of one or more plasticizers, and allowing a mixing/oxidation step, wherein an oxidised mixture is produced, followed by an oxidation step, wherein the oxidised mixture is allowed to continue to react for a dwell time of dwell time of 1 second to 10 hours, such as 10 seconds to 6 hours, such as 30 seconds to 2 hours.

Components (a), (b), (c) and (d) are as defined above under Method II to prepare oxidised lignins.

In one embodiment of the invention, the process comprises a premixing step in which components are brought into contact with each other.

In the premixing step the following components can be brought into contact with each other:

- component (a) and component (b), or
- component (a) and component (b) and component (c), or
- component (a) and component (b) and component (d), or
- component (a) and component (b) and component (c) and component (d).

In an embodiment of the invention, it is possible that the premixing step is carried out as a separate step and the mixing/oxidation step is carried out subsequently to the premixing step. In such an embodiment of the invention it is particularly advantageous to bring component (a) and component (b) and optionally component (d) into contact with each other in a premixing step. In a subsequent mixing/oxidation step, component (c) is then added to the premixture produced in the premixing step.

In another example of the invention, it is possible that the premixing step corresponds to the mixing/oxidation step. In this embodiment of the invention, the components, for example component (a), component (b) and component (c) are mixed and an oxidation process is started at the same time. It is possible that the subsequent dwell time is performed in the same device as that used to perform the mixing/oxidation step. Such an implementation of the invention is particularly advantageous if component (c) is air.

The present inventors have found out that by allowing a mixing/oxidation step followed by an oxidation step, in which the reaction mixture is preferably not continued to be mixed, the oxidation rate can be controlled in a very efficient manner. At the same time, the costs for performing the method are reduced because the oxidation step subsequent to the mixing/oxidation step requires less complex equipment.

Another advantage is that oxidized lignin, which is produced is particularly stable. Another surprising advantage is that the oxidized lignin produced is very well adjustable in terms of viscosity. Another surprising advantage is that the concentration of the oxidized lignin can be very high.

In one embodiment, the dwell time is so chosen that the oxidation reaction is brought to the desired degree of completion, preferably to full completion.

System I for Performing the Method III

In one embodiment, the system for performing the method comprises:

- at least one rotor-stator device,
- one or more inlets for water and components (a) and (b),
- one or more outlets of the rotor-stator device,
- at least one reaction device, in particular at least one reaction tube, which is arranged downstream in the process flow direction to at least one or more of the outlets.

In one embodiment, the system comprises one or more inlets for component (c) and/or component (d).

In one embodiment, the system comprises a premixing device.

The premixing device can comprise one or more inlets for water and/or component (a) and/or component (b) and/or component (c) and/or component (d).

In one embodiment of the invention, the premixing device comprises inlets for water and component (a) and component (b).

It is possible that, in a premixing step, component (c) is also mixed with the three mentioned ingredients (water, component (a) and component (b)). It is then possible that the premixing device has a further inlet for component (c). If component (c) is air, it is possible that the premixing device is formed by an open mixing vessel, so that in this case component (c) is already brought into contact with the other components (water, component (a) and component (b)) through the opening of the vessel. Also in this embodiment of the invention, it is possible that the premixing device optionally comprises an inlet for component (d).

In one embodiment, the system is constructed in such a way that the inlets for components (a), (b) and (d) are inlets of a premixing device, in particular of an open rotor-stator device, whereby the system furthermore comprises an additional rotor-stator device, said additional rotor-stator device having an inlet for component (c) and said additional rotor-stator device having an outlet for an oxidized lignin.

It is possible that the premixing step and the mixing/oxidizing step are carried out simultaneously. In this case, the premixing device and the mixing/oxidizing device are a single device, i. e. a rotor-stator device.

In one embodiment, one rotator-stator device used in the method according to the present invention comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the center.

System II for Performing the Method III

In one embodiment, the system for performing the method comprises:

- one or more inlets for water, components (a) and (b),
- at least one mixing and oxidizing apparatus with one or more outlets, and
- at least one mixer/heat-exchanger, which is arranged downstream in the process flow direction to the at least one or more of the outlets, whereby the mixer/heat-exchanger comprises a temperature control device.

In one embodiment, the system comprises additional one or more inlets for component (c) and/or component (d).

In one embodiment, the system comprises a premixing device.

The premixing device can comprise one or more inlets for water and/or component (a) and/or component (b) and/or component (c) and/or component (d).

In one embodiment, the premixing device comprises inlets for water and component (a) and component (b).

It is possible that, in a premixing step, component (c) is also mixed with the three mentioned ingredients (water, component (a) and component (b)). It is then possible that the premixing device has a further inlet for component (c). If component (c) is air, it is possible that the premixing device is formed by an open mixing vessel, so that in this case component (c) is already brought into contact with the other components (water, component (a) and component (b)) through the opening of the vessel. Also in this embodiment of the invention, it is possible that the premixing device optionally comprises an inlet for component (d).

In one embodiment, the system is constructed in such a way that the inlets for components (a), (b) and (d) are inlets of an open rotor-stator device, whereby the system furthermore comprises a mixer/heat-exchanger, having an inlet for component (c) and an outlet for an oxidized lignin.

It is possible that the premixing step and the mixing/oxidizing step are carried out simultaneously. In this case, the premixing device and the mixing/oxidizing device are a single device.

In one embodiment, one rotator-stator device used in the method according to the present invention comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the center.

Of course other devices can also be used as premixing devices. Furthermore, it is possible that the premixing step is carried out in the mixing and oxidizing apparatus.

In one embodiment, the mixing and oxidizing apparatus is a static mixer. A static mixer is a device for the continuous mixing of fluid materials, without moving components. One design of static mixer is the plate-type mixer and another common device type consists of mixer elements contained in a cylindrical (tube) or squared housing.

In one embodiment, the mixer/heat-exchanger is constructed as multitube heat exchanger with mixing elements. The mixing element are preferably fixed installations through which the mixture has to flow, whereby mixing is carried out as a result of the flowing through. The mixer/heat-exchanger can be constructed as a plug flow reactor.

BRIEF DESCRIPTION OF THE DRAWINGS

In the drawings,

FIG. 4 shows a summary of the properties of technical lignins.

EXAMPLES I

Figure 1:
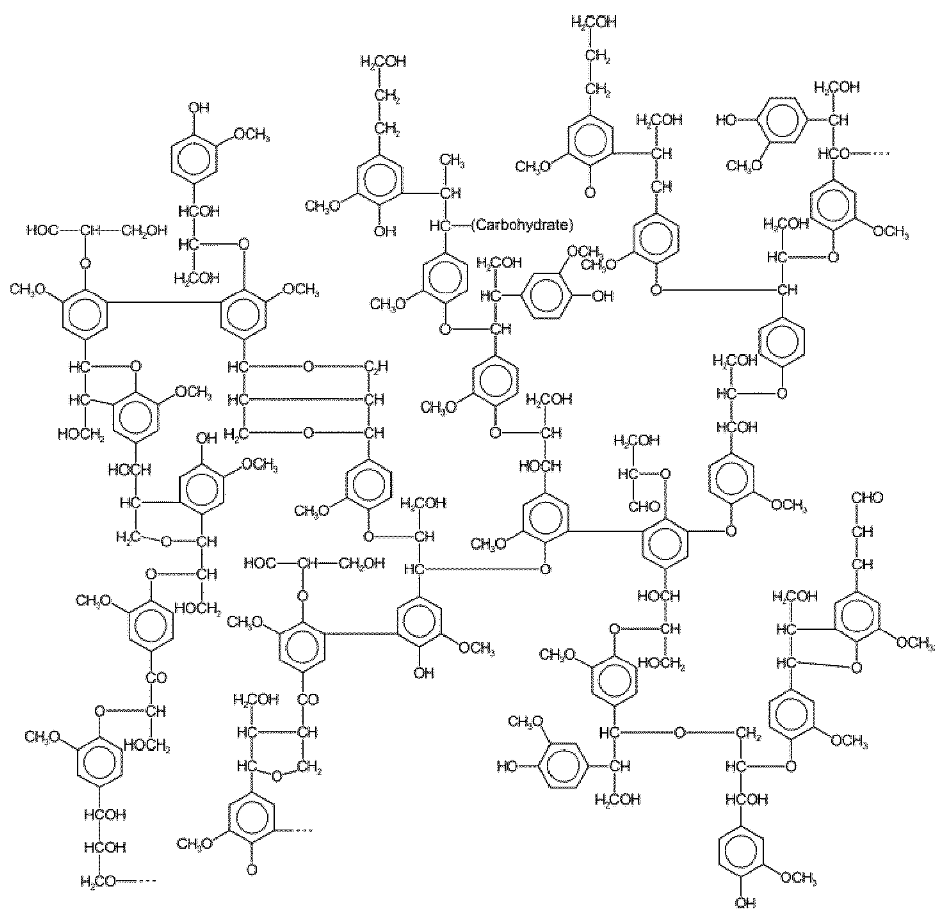
FIG. 1 shows a section from a possible lignin structure.
Figure 2:
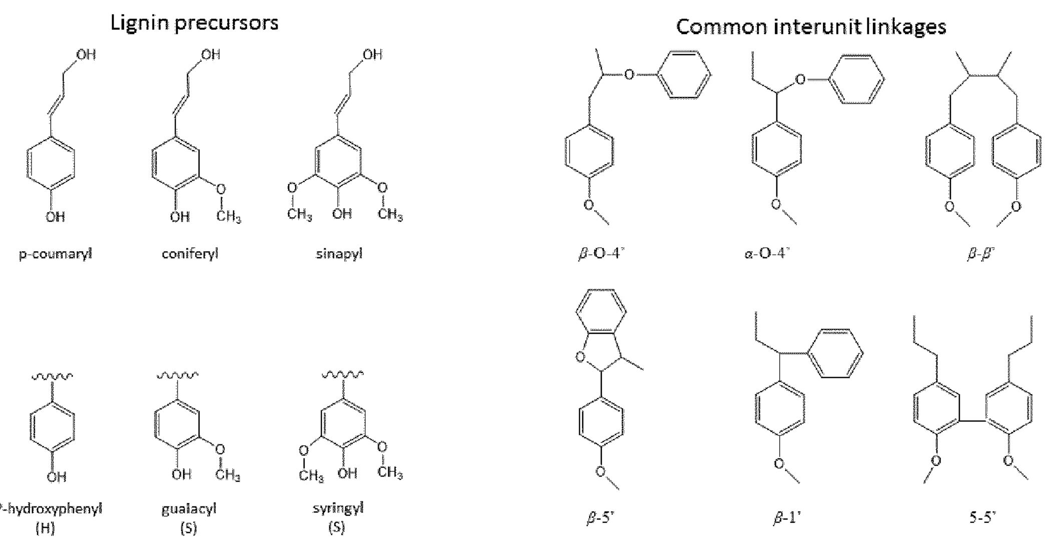
FIG. 2 shows structures of lignin precursors and common interunit linkages.
Figure 3:
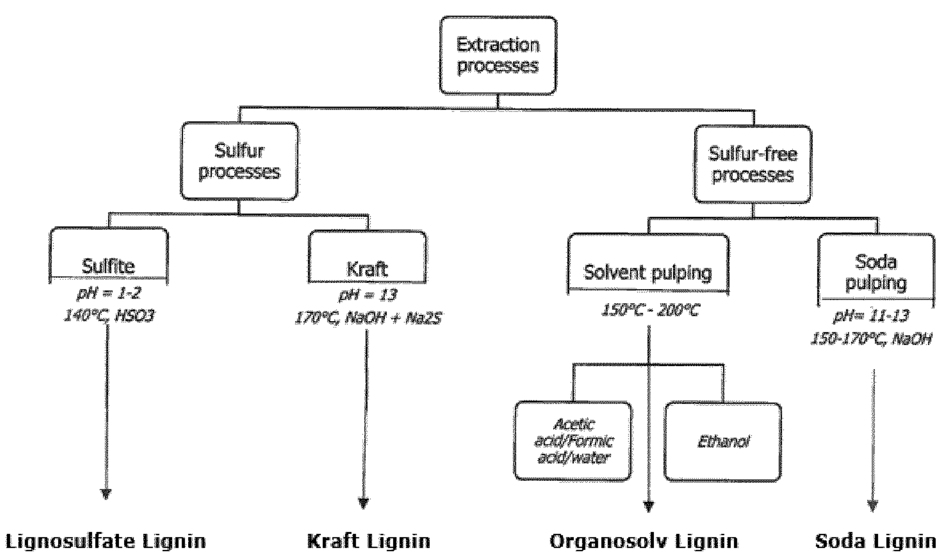
FIG. 3 shows a reaction scheme for making various lignins.

Example IA—Lignin Oxidation in Ammonia Aqueous Solution by Hydrogen Peroxide The amounts of ingredients used according to the example IA are provided in table IA 1.1 and IA 1.2.

Although kraft lignin is soluble in water at relatively high pH, it is known that at certain weight percentage the viscosity of the solution will strongly increase. It is typically believed that the reason for the viscosity increase lies in a combination of strong hydrogen bonding and interactions of n-electrons of numerous aromatic rings present in lignin. For kraft lignin an abrupt increase in viscosity around 21-22 wt.-% in water was observed and 19 wt.-% of kraft lignin were used in the example presented.

Ammonia aqueous solution was used as base in the pH adjusting step. The amount was fixed at 4 wt.-% based on the total reaction weight. The pH after the pH adjusting step and at the beginning of oxidation was 10.7.

Table IA2 shows the results of CHNS elemental analysis before and after oxidation of kraft lignin. Before the analysis, the samples were heat treated at 160° C. to remove adsorbed ammonia. The analysis showed that a certain amount of nitrogen became a part of the structure of the oxidised lignin during the oxidation process.

During testing in batch experiments, it was determined that it is beneficial for the oxidation to add the entire amount of hydrogen peroxide during small time interval contrary to adding the peroxide in small portions over prolonged time period. In the present example 2.0 wt.-% of $H_2O_2$ based on the total reaction weight was used.

The oxidation is an exothermic reaction and increase in temperature is noted upon addition of peroxide. In this example, temperature was kept at 60° C. during three hours of reaction.

After the oxidation, the amount of lignin functional groups per gram of sample increased as determined by $^{31}P$ NMR and aqueous titration. Sample preparation for $^{31}P$ NMR was performed by using 2-chloro-4,4,5,5-tetramethyl-1,3,2-dioxaphospholane (TMDP) as phosphitylation reagent and cholesterol as internal standard. NMR spectra of kraft lignin before and after oxidation were made and the results are summarized in table IA3.

The change in COOH groups was determined by aqueous titration and utilization of the following formula:

$$C_{(COOH,mmol/g)} = \frac{(V_{2s,ml} - V_{1s,ml}) - (V_{2b,ml} - V_{1b,ml}) * C_{acid,mol/l}}{m_{s,g}}$$

Where $V_{2s}$ and $V_{1s}$ are endpoint volumes of a sample while $V_{2b}$ and $V_{1b}$ are the volume for the blank. $C_{acid}$ is 0.1M HCl in this case and $m_s$ is the weight of the sample. The values obtained from aqueous titration before and after oxidation are shown in table IA4.

The average COOH functionality can also be quantified by a saponification value which represents the number of mg of KOH required to saponify 1 g lignin. Such a method can be found in AOCS Official Method Cd 3-25.

Average molecular weight was also determined before and after oxidation with a PSS PolarSil column (9:1 (v/v) dimethyl sulphoxide/water eluent with 0.05 M LiBr) and UV detector at 280 nm. Combination of COOH concentration and average molecular weight also allowed calculating average carboxylic acid group content per lignin macromolecule and these results are shown in table IA5.

Example IB—Upscaling the Lignin Oxidation in Ammonia by Hydrogen Peroxide to Pilot Scale Lignin oxidation with hydrogen peroxide is an exothermic process and even in lab-scale significant temperature increases were seen upon addition of peroxide. This is a natural concern when scaling up chemical processes since the amount of heat produced is related to dimensions in the $3^{rd}$ power (volume) whereas cooling normally only increase with dimension squared (area). In addition, due to the high viscosity of the adhesive intermediates process equipment has to be carefully selected or designed. Thus, the scale up was carefully engineered and performed in several steps.

The first scale up step was done from 1 L (lab scale) to 9 L using a professional mixer in stainless steel with very efficient mechanical mixing The scale-up resulted only in a slightly higher end temperature than obtained in lab scale, which was attributed to efficient air cooling of the reactor and slow addition of hydrogen peroxide The next scale up step was done in a closed 200 L reactor with efficient water jacket and an efficient propeller stirrer. The scale was this time 180 L and hydrogen peroxide was added in two steps with appr. 30 minute separation. This up-scaling went relatively well, though quite some foaming was an issue partly due to the high degree reactor filling. To control the foaming a small amount of food grade defoamer was sprayed on to the foam. Most importantly the temperature controllable and end temperatures below 70° C. were obtained using external water-cooling.

The pilot scale reactions were performed in an 800 L reactor with a water cooling jacket and a twin blade propeller stirring. 158 kg of lignin (UPM LignoBoost™ BioPiva 100) with a dry-matter content of 67 wt.-% was de-lumped and suspended in 224 kg of water and stirred to form a homogenous suspension. With continued stirring 103 kg of 25% ammonia in water was pumped into the reactor and stirred another 2 hours to from a dark viscous solution of lignin.

To the stirred lignin solution 140 kg of 7.5 wt.-% at 20-25° C. hydrogen peroxide was added over 15 minutes. Temperature and foam level was carefully monitored during and after the addition of hydrogen peroxide and cooling water was added to the cooling jacket in order to maintain an acceptable foam level and a temperature rise less than 4° C. per minute as well as a final temperature below 70° C. After the temperature increase had stopped, cooling was turned off and the product mixture was stirred for another 2 hours before transferring to transport container.

Based on the scale up runs it could be concluded that even though the reactions are exothermic a large part of the reaction heat is actually balanced out by the heat capacity of the water going from room temperature to about 60° C., and only the last part has to be removed by cooling. It should be noted that due to this and due to the short reaction time this process would be ideal for a scale up and process intensification using continuous reactors such as in-line mixers, tubular reactors or CSTR type reactors. This would ensure good temperature control and a more well-defined reaction process.

Tests of the scale up batches indicated the produced oxidised lignin had properties in accordance to the batches produced in the lab.

TABLE IA 1.1

The amounts of materials used in their supplied form

| material | wt.-% |
|---|---|
| UPM BioPiva 100, kraft lignin | 28 |
| $H_2O_2$, 30 wt.-% solution in water | 6.6 |
| $NH_3$, 25 wt.-%, aqueous solution | 16 |
| water | 49.4 |

TABLE IA 1.2

The amounts of active material used:

| material | wt.-% |
|---|---|
| kraft lignin | 19 |
| $H_2O_2$ | 2 |
| $NH_3$ | 4 |
| water | 75 |

TABLE IA 2

Elemental analysis of kraft lignin before and after oxidation:

| sample | N (wt.-%) | C (wt.-%) | H (wt.-%) | S (wt.-%) |
|---|---|---|---|---|
| kraft lignin | 0.1 | 64.9 | 5.8 | 1.7 |
| ammonia oxidised kraft lignin | 1.6 | 65.5 | 5.7 | 1.6 |

TABLE IA 3

Kraft lignin functional group distribution before and after oxidation obtained by $^{31}P$-NMR:

| | Concentration (mmol/g) | | |
|---|---|---|---|
| sample | Aliphatic OH | Phenolic OH | Acid OH |
| kraft lignin | 1.60 | 3.20 | 0.46 |
| ammonia oxidised kraft lignin | 2.11 | 3.60 | 0.80 |

TABLE IA 4

COOH group content in mmol/g as determined by aqueous titration

| sample | COOH groups (mmol/g) |
|---|---|
| kraft lignin | 0.5 |
| ammonia oxidised kraft lignin | 0.9 |

TABLE IA 5

Number (Mn) and weight (Mw) average molar masses as determined by size exclusion chromatography expressed in g/mol together with average carboxylic acid group content per lignin macromolecule before and after oxidation

| sample | Mn, g/mol | Mw, g/mol | average COOH functionality |
|---|---|---|---|
| kraft lignin | 1968 | 21105 | 0.9 |
| ammonia oxidised kraft lignin | 2503 | 34503 | 2.0 |

EXAMPLES II

In the following examples, several oxidised lignins were prepared.

The following properties were determined for the oxidised lignins:

Component Solids Content:

The content of each of the components in a given oxidised lignin solution is based on the anhydrous mass of the components or as stated below.

Kraft lignin was supplier by UPM as BioPiva100™ as dry powder. $NH_4OH$ 25% was supplied by Sigma-Aldrich and used in supplied form. $H_2O_2$, 30% (Cas no 7722-84-1) was supplied by Sigma-Aldrich and used in supplied form or by dilution with water. PEG 200 was supplied by Sigma-Aldrich and were assumed anhydrous for simplicity and used as such. PVA (Mw 89.000-98.000, Mw 85.000-124.000, Mw 130.000, Mw 146.000-186.000) (Cas no 9002-89-5) were supplied by Sigma-Aldrich and were assumed anhydrous for simplicity and used as such. Urea (Cas no 57-13-6) was supplied by Sigma-Aldrich and used in supplied form or diluted with water. Glycerol (Cas no 56-81-5)

was supplied by Sigma-Aldrich and was assumed anhydrous for simplicity and used as such.

Oxidised Lignin Solids

The content of the oxidised lignin after heating to 200° C. for 1 h is termed "Dry solid matter" and stated as a percentage of remaining weight after the heating. Disc-shaped stone wool samples (diameter: 5 cm; height 1 cm) were cut out of stone wool and heat-treated at 580° C. for at least 30 minutes to remove all organics. The solids of the binder mixture were measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the dry solids matter was calculated as an average of the two results.

COOH Group Content

The change in COOH group content was also determined by aqueous titration and utilization of the following formula:

$$C_{(COOH,mmol/g)} = \frac{(V_{2s,ml} - V_{1s,ml}) - (V_{2b,ml} - V_{1b,ml}) * C_{acid,mol/l}}{m_{s,g}}$$

Where $V_{2s}$ and $V_{1s}$ are endpoint volumes of a sample while $V_{2b}$ and $V_{1b}$ are the volume for a blank sample. $C_{acid}$ is 0.1M HCl in this case and $m_{s,g}$ is the weight of the sample.

Method of Producing an Oxidised Lignin:

1) Water and lignin was mixed in a 3-necked glass bottomed flask at water bath at room temperature (20-25° C.) during agitation connected with a condenser and a temperature logging device. Stirred for 1 h.
2) Ammonia was added during agitation in 1 portion.
3) Temperature increased to 35° C. by heating, if the slightly exothermic reaction with ammonia does not increase the temperature.
4) pH was measured.
5) Plasticizer PEG200 was added and stirred 10 min.
6) After the lignin was completely dissolved after approximately 1 hour, 30% $H_2O_2$ was added slowly in one portion.
7) The exothermic reaction by addition of $H_2O_2$ increased the temperature in the glass bottomed flask—if the reaction temperature was lower than 60° C., the temperature was increased to 60° C. and the sample was left at 60° C. for 1 hour.
8) The round bottomed flask was then removed from the water bath and cooled to room temperature.
9) Samples were taken out for determination of dry solid matter, COOH, viscosity, density and pH.

Oxidised Lignin Compositions

In the following, the entry numbers of the oxidised lignin example correspond to the entry numbers used in Table II.

Example IIA 71.0 g lignin UPM Biopiva 100 was dissolved in 149.0 g water at 20° C. and added 13.3 g 25% $NH_4OH$ and stirred for 1 h by magnetic stirrer, where after 16.8 g $H_2O_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

Example IIE 71.0 g lignin UPM Biopiva 100 was dissolved in 88.8 g water at 20° C. and added 13.3 g 25% $NH_4OH$ and stirred for 1 h by magnetic stirrer. PEG 200, 22.8 g was added and stirred for 10 min, where after 16.7 g $H_2O_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

Example IIC 71.0 g lignin UPM Biopiva 100 was dissolved in 57.1 g water at 20° C. and added 13.3 g 25% $NH_4OH$ and stirred for 1 h by mechanical stirrer, where after 16.6 g $H_2O_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

Example IIF 71.0 g lignin UPM Biopiva 100 was dissolved in 57.1 water at 20° C. and added 13.3 g 25% $NH_4OH$ and stirred for 1 h by mechanical stirrer. PEG 200, 19.0 g was added and stirred for 10 min, where after 16.6 g $H_2O_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

TABLE IIA

| Example | Ex. IIA | Ex. IIB | Ex. IIC | Ex. IID | Ex. IIE | Ex. IIF | Ex. IIG | Ex. IIH | Ex. III | Ex. IIJ |
|---|---|---|---|---|---|---|---|---|---|---|
| Materials, weight in grams: | | | | | | | | | | |
| Lignin | 71.0 | 71.0 | 71.0 | 71.0 | 71.0 | 71.0 | 71.0 | 71.0 | 71.0 | 71.0 |
| Water | 149.0 | 88.8 | 57.1 | 17.7 | 88.8 | 57.1 | 17.7 | 88.8 | 57.1 | 17.7 |
| NH4OH (25 wt % solution in water) | 13.3 | 13.3 | 13.3 | 13.4 | 13.3 | 13.3 | 13.4 | 13.3 | 13.3 | 13.4 |

TABLE IIA-continued

| | | | | | | | | | | |
|---|---|---|---|---|---|---|---|---|---|---|
| $H_2O_2$ (30 wt % solution in water) | 16.8 | 16.7 | 16.6 | 17.2 | 16.7 | 16.6 | 17.2 | 16.7 | 16.6 | 17.2 |
| PEG200 | 0.0 | 0.0 | 0.0 | 0.0 | 22.8 | 19.0 | 14.2 | 0.0 | 0.0 | 0.0 |
| PVA | 0 | 0 | 0 | 0 | 0 | 0 | 0 | 5 | 10 | 15 |
| Urea (25 wt % solution in water) | 0 | 0 | 0 | 0 | 0 | 0 | 0 | 0 | 0 | 0 |
| Glycerol | 0 | 0 | 0 | 0 | 0 | 0 | 0 | 0 | 0 | 0 |
| Sorbitol | 0 | 0 | 0 | 0 | 0 | 0 | 0 | 0 | 0 | 0 |
| Dry solid matter in %, 200° C., 1 h | 18.2 | 27.1 | 30.5 | 40.1 | 26.5 | 33 | 40.3 | 28.2 | 34.4 | 46.3 |
| pH | 9.5 | 9.5 | 9.5 | 9.5 | 9.5 | 9.5 | 9.5 | 9.5 | 9.5 | 9.5 |
| Viscosity, 20° C. cP | 450.5 | 25000 | above 100000 | above 100000 | 15000 | 25000 | 50000 | 15000 | 25000 | 50000 |
| Appearance | ** | *** | * | * | *** | *** | *** | *** | *** | *** |
| COOH, mmol/g | 1.1 | 0.9 | 0.9 | 0.8 | 0.8 | 1.9 | — | — | — | — |
| Initial lignin conc. Weight fraction of aq. sol. | 0.32 | 0.44 | 0.55 | 0.80 | 0.44 | 0.55 | 0.80 | 0.44 | 0.55 | 0.80 |

| Example | Ex. IIK | Ex. IIL | Ex. IIM | Ex. IIN | Ex. IIO | Ex. IIP | Ex. IIQ | Ex. IIR | Ex. IIS |
|---|---|---|---|---|---|---|---|---|---|
| Materials, weight in grams: | | | | | | | | | |
| Lignin | 71.0 | 71.0 | 71.0 | 71.0 | 71.0 | 71.0 | 93.5 | 112.3 | 149.5 |
| Water | 88.8 | 57.1 | 17.7 | 88.8 | 57.1 | 17.7 | 117 | 90.3 | 37.3 |
| NH4OH (25 wt % solution in water) | 13.3 | 13.3 | 13.4 | 13.3 | 13.3 | 13.4 | 17.5 | 21 | 28.3 |
| $H_2O_2$ (30 wt % solution in water) | 16.7 | 16.6 | 17.2 | 16.7 | 16.6 | 17.2 | 22 | 26.3 | 36.3 |
| PEG200 | 0.0 | 0.0 | 0.0 | 0.0 | 0.0 | 0.0 | 0.0 | 0.0 | 0.0 |
| PVA | 0 | 0 | 0 | 0 | 0 | 0 | 0 | 0 | 0 |
| Urea (25 wt % solution in water) | 3.2 | 3.8 | 5.0 | 0 | 0 | 0 | 0 | 0 | 0 |
| Glycerol | 0 | 0 | 0 | 16.0 | 21.0 | 30.0 | 0 | 0 | 0 |
| Sorbitol | 0 | 0 | 0 | 0 | 0 | 0 | 16.0 | 21.0 | 30.0 |
| Dry solid matter in %, 200° C., 1 h | 25.1 | 30.2 | 40.2 | 25.3 | 29.3 | 40.3 | 25.3 | 30.5 | 38.8 |
| pH | 9.5 | 9.5 | 9.5 | 9.5 | 9.5 | 9.5 | 9.5 | 9.5 | 9.5 |
| Viscosity, 20° C. cP | 15000 | 25000 | 50000 | 15000 | 25000 | 50000 | 15000 | 25000 | 50000 |
| Appearance | *** | *** | *** | *** | *** | *** | *** | *** | *** |
| COOH, mmol/g | — | — | — | — | — | — | — | — | — |
| Initial lignin conc. Weight fraction of aq. sol. | 0.44 | 0.55 | 0.80 | 0.44 | 0.55 | 0.80 | 0.44 | 0.55 | 0.80 |

[*] inhomogenous black thick solution;

[**] black solution;

[***] homogenous black thick solution.

EXAMPLE III 8.5 l hot water (50° C.) and 1.9 l $NH_4OH$ (24.7%) was mixed, where after 9.0 kg lignin (UPM biopiva 100) was added slowly over 10 minutes at high agitation (660 rpm, 44 Hz).

The temperature increased by high shear forces. After 30 minutes, 4 l of hot water was added, and the material was stirred for another 15 minutes before adding the remaining portion of hot water (5 l). Samples were taken out for analyses of un-dissolved lignin by use of a Hegman Scale and pH measurements.

This premix was then transferred to a rotor-stator device and a reaction device where the oxidation was made by use of $H_2O_2$ (17.5 vol %). The reaction device used in this case has at least partially a reaction tube and a reaction vessel. Dosage of the premixture was 150 l/h and the $H_2O_2$ was dosed at 18 l/h.

In the present case, a Cavitron CD1000 rotor-stator device was used to carry out the mixing/oxidation step. The rotor-stator device was run at 250 Hz (55 m/s circumferential speed) with a counter pressure at 2 bar. The dwell time in the reaction tube was 3.2 minutes and in the reaction vessel 2 hours.

Temperature of the premixture was 62° C., and the oxidation step increased the temperature to 70° C.

The final product was analysed for the COOH group content, dry solid matter, pH, viscosity and remaining $H_2O_2$.

TABLE III

| Example | Dry solid matter, 200 C, 1h, % | COOH, mmol/g solids | pH | viscosity |
|---|---|---|---|---|
| III | 22.3 | 1.13 | 9.6 | medium |

EXAMPLE IV 484 l hot water (70° C.) and 47.0 l $NH_4OH$ (24.7%) was mixed, where after 224.0 kg lignin (UPM biopiva 100) was added slowly over 15 minutes at high agitation. Samples were taken out for analyses of un-dissolved lignin by use of a Hegman Scale and pH measurements.

This premixture was then transferred to a static mixer and a mixer/heat-exchanger, where the oxidation was made by use of $H_2O_2$ (35 vol %). Dosage of the premixture was 600 l/h and the $H_2O_2$ was dosed at 17.2 l/h. The dwell time in the mixer/heat-exchanger was 20 minutes.

The temperature of the mixture increased during the oxidation step up to 95° C.

The final product was analysed for the COOH group content, dry solid matter, pH, viscosity and remaining $H_2O_2$.

A binder was made based on this AOL: 49.3 g AOL (19.0% solids), 0.8 g primid XL552 (100% solids) and 2.4 g PEG200 (100% solids) were mixed with 0.8 g water to yield 19% solids; and then used for test of mechanical properties in bar tests.

Bar Tests

The mechanical strength of the binders was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured at 200° C. The curing time was 1 h. After cooling to room temperature, the bars were carefully taken out of the containers. Five of the bars were aged in a water bath at 80° C. for 3 h.

After drying for 1-2 days, the aged bars as well as five unaged bars were broken in a 3 point bending test (test speed: 10.0 mm/min; rupture level: 50%; nominal strength: 30 N/mm$^2$; support distance: 40 mm; max deflection 20 mm; nominal e-module 10000 N/mm$^2$) on a Bent Tram machine to investigate their mechanical strengths. The bars were placed with the "top face" up (i.e. the face with the dimensions length=5.6 cm, width=2.5 cm) in the machine.

| | AOL characteristica | | | Bar tests | |
|---|---|---|---|---|---|
| Sample name | solids, 200 C, 1h, % | COOH (mmol/g solids) | Viscosity | initial strength (kN) | Aged strength (kN) |
| Ex IV | 17.7 | 1.69 | low | 0.28 | 0.11 |

Experimental Part Directed to Alternative A

EXAMPLES

In the following examples, several mineral wool products containing binders which fall under the definition of the present invention were prepared and compared to mineral wool products containing binders according to the prior art.

Indications of percentage (%) refer to percent by weight, unless otherwise stated.

The following properties were determined for the mineral wool products containing binders according to the present invention and the mineral wool products containing binders according to the prior art, respectively:

Determination of Isocyanic Acid (ICA) Emission

The amount of ICA off-gassed from the mineral fibre product containing the cured binder composition can be measured according to the following Protocol I. The same Protocol I can be used to analyse the amount of $NH_3$ and/or HCN emitted.

Protocol I

Samples of mineral wool products have been analysed by thermal tests. The thermal test system consists of a temperature adjustable tube furnace provided with a quartz glass tube, connected to the GASMET DX4000 FTIR (fourier-transform infrared spectroscopy) analyzer via heat traced transport tubes. The tube in the tube furnace is a quartz tube (diameter 23 mm, length: 800 mm, thickness 2.0 mm) with conical female glass joints in both ends: NS 24/29. The tube furnace used is from Nabertherm, model R30/500/12-B170.

The GASMET analyzer is equipped with an internal pump that supplies the required amount of gas to perform a proper analysis of the gas. The quartz glass tube is open to the surroundings to secure proper amounts of carrier gas to the analyzer along with the emitted gases from the test specimen.

The mineral wool products were homogenized by crushing. Approximately 2 g sample was weighed and distributed evenly in a porcelain crucible and loaded in the quartz tube at pre-adjusted temperatures. The current test temperature at the sample was monitored by a thermocouple. During the whole test, air is passed through the tube at a rate of 1 L/min at 25° C.

The system was tested for leaks, and cleanliness of the quartz tube prior to any test run by analyzing the compressed air passing through the system. The cleanliness was only accepted if the tested gases were 0 ppm. Values above 0 ppm triggered cleaning of the quartz tube.

All sample points were repeated thrice to ensure high reliability of the measured values.

Upon sample loading, the GASMET data sampling was initiated. The sampling frequency was adjusted to 5 seconds, followed by approximately 2 seconds of processing, resulting in an average duration of each sample point of 6.77 seconds.

The accuracy of the GASMET is 8 $cm^{-1}$.

The samples were monitored during data collection to observe the burn-out time of the individually emitted species. Data collection was stopped when all species had declined significantly. The samples collected at 250° C. and 350° C. were stopped after the time spent indicated in Table A (averaged elapsed time), although not all emission had declined to zero, though very close, whereas the samples collected at 450° C. and 600° C. was burnt out to near-zero values faster, sometimes only in a few minutes.

Spectres were analysed by use of Calcmet Software, and the system has been calibrated to the respective species beforehand.

The emissions were compiled for each sample, data was cut off after all emissions for the respective species (ICA or any other species to be measured) had approached zero. The integration below the curve is performed by summarizing the individually measured contributions (approximating a numerical integration).

The emission rate is calculated by taking weight, solid content and duration into consideration. The result is given in the unit "ppm isocyanic acid per gram solid content per second". With respect to "gram solid content" the solid content (LOI) refers to the quantity of organic material (loss of ignition) in the mineral fiber product.

Example for Determination of Amount of ICA Off-Gassed:

Sample product at 450° C., ICA emission: The integration below the curve adds up to 6134 ppm ICA, the cut-off time is 503 seconds, sample weight is 2,215 g, solid content (by weight) is 2.3%. This yields: 6134 ppm ICA/(2.3%·503 seconds·2,215 g)=239 ppm ICA/(g solid content second)

Determination of Solid Content (Loss of Ignition (LOI))

The quantity of organic material (loss of ignition) is determined as the loss of weight of the specimen obtained by burning away of organic material measured at 590° C. Normally, the organic material is binder and impregnating oil. This is done as specified in EN 13820. The binder content is taken as the LOT. The binder includes oil and other binder additives, if present.

Determination of Maximum Service Temperature

The Maximum Service Temperature of mineral fiber products were determined according to the Maximum Service Temperature plate test of standard EN 14706:2012.

Determination of Binder Solids

The content of binder after curing is termed "binder solids".

Disc-shaped stone wool samples (diameter: 5 cm; height 1 cm) were cut out of stone wool and heat-treated at 580° C. for at least 30 minutes to remove all organics. The solids of the binder mixture was measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the binder solids was calculated as an average of the two results.

Unless stated otherwise, the following reagents were used as received:

Lignin UPM BioPiva 100: Kraft lignin supplied by UPM as BioPiva100™ as dry powder.

PEG 200: supplied by Sigma-Aldrich and assumed anhydrous for simplicity and used as such.

Primid XL552: hydroxyalkylamide crosslinker supplied by EMS-CHEMIE AG Momentive VS142: Silquest® VS-142 is an aqueous oligomeric aminosiane supplied by Momentive Preparation of Ammonia Oxidized Lignin (AOL) Resin 3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown binder. During the dissolution step will the lignin solution change color from brown to shiny black.

After the lignin is completely dissolved, 1 liter of a foam dampening agent (Skumdæmper 11-10 from NCÅ-Verodan) is added. Temperature of the batch is maintained at 40° C.

Then addition of 307.5 kg 35% hydrogen peroxide is started. The hydrogen peroxide is dosed at a rate of 200-300 liter/hour. First half of the hydrogen peroxide is added at a rate of 200 l/h where after the dosage rate is increased to 300 liter/hour.

During the addition of hydrogen peroxide the temperature in the reaction mixture is controlled by heating or cooling in such a way that a final reaction temperature of 65° C. is reached.

After 15 min reaction at 65° C. is the reaction mixture cooled to a temperature below 50° C. Hereby is a resin obtained having a COOH value of 1.2 mmol/g solids.

Final Binder Preparation (Uncured Binder Composition Suitable for Preparing the Mineral Fiber Product of the Invention)

From the above mentioned AOL resin a binder was formulated by addition of 270 kg polyethylene glycol 200 (PEG 200) and 433 kg of a 31% solution of Primid XL-552 in water.

Analysis of the final binder showed the following data

Solids content: 18.9% pH: 9.7

Viscosity: 25.5 mPas·s

Density: 1.066 kg/l

Comparative Example 1

This binder is a phenol-formaldehyde resin modified with urea, a PUF-resol. A phenol-formaldehyde resin is prepared by reacting 37% aq. formaldehyde (606 kg) and phenol (189 kg) in the presence of 46% aq. potassium hydroxide (25.5 kg) at a reaction temperature of 84° C. preceded by a heating rate of approximately 1° C. per minute. The reaction is continued at 84° C. until the acid tolerance of the resin is 4 and most of the phenol is converted. Urea (241 kg) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

AT=(Used titration volume (mL))/(Sample volume (mL))

Using the urea-modified phenol-formaldehyde resin obtained, a binder is made by addition of 25% aq. ammonia (90 L) and ammonium sulfate (13.2 kg) followed by water (1300 kg).

To the above mix is added 18% Dextrose (127.5 kg) based upon the dry matter of the above binder and the dextrose.

The binder solids were then measured as described above and the mixture was diluted with the required amount of water and silane for mechanical measurements.

A mineral fiber product was prepared with 100 mm mineral wool bonded with this prior art binder composition. The density of the mineral fiber product was 145 kg/m$^3$. The ignition loss was 2.4%. The proportion of the cured binder composition in the mineral fiber product was 2.3% due to 0.1% mineral oil.

The mineral fibre product prepared was tested as described in the Protocol I. The results are given in the Table A below.

Comparative Example 2

A mixture of 75.1% aq. glucose syrup (19.98 kg; thus efficiently 15.0 kg glucose syrup), 50% aq. hypophosphorous acid (0.60 kg; thus efficiently 0.30 kg, 4.55 mol hypophosphorous acid) and sulfamic acid (0.45 kg, 4.63 mol) in water (30.0 kg) was stirred at room temperature until a clear solution was obtained. 28% aq. ammonia (0.80 kg; thus efficiently 0.22 kg, 13.15 mol ammonia) was then added dropwise until pH=7.9. The binder solids was then measured (21.2%). In order to obtain a suitable binder composition (15% binder solids solution, 0.5% silane of binder solids), the binder mixture was diluted with water (0.403 kg/kg binder mixture) and 10% aq. silane (0.011 kg/kg binder mixture, Momentive VS-142). The final binder mixture had pH=7.9.

Mineral fiber products were prepared with a thickness of 100 mm, a density of 145 kg/m$^3$ and LOI at 2.5%. A common method for producing the mineral fibre product as described in the description above is used.

The mineral fibre product prepared was tested as described in the Protocol I. The results are given in the Table A below.

Example 1

3267 kg of water is charged in 6000 l reactor followed by 861 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour is a check made on insolubilized lignin. This can be made by checking the solution on a glass plate or a Hegman gauge. Insolubilized lignin is seen as small particles in the brown binder. During the dissolution step will the lignin solution change color from brown to shiny black. After the lignin is completely dissolved, 1 liter of a foam dampening agent (Skumdæmper 11-10 from NCÅ-Verodan) is added. Temperature of the batch is maintained at 40° C.

Then addition of 307.5 kg 35% hydrogen peroxide is started. The hydrogen peroxide is dosed at a rate of 200-300 liter/hour. First half of the hydrogen peroxide is added at a rate of 200 l/h where after the dosage rate is increased to 300 liter/hour.

During the addition of hydrogen peroxide is the temperature in the reaction mixture controlled by heating or cooling in such a way that a final reaction temperature of 65° C. is reached.

After 15 min reaction at 65° C. is the reaction mixture cooled to a temperature below 50° C. Hereby is a resin obtained having a COOH value of 1.1 mmol/g solids.

Final Binder Preparation

From the above mentioned AOL resin a binder was formulated by addition of 270 kg polyethylene glycol 200 and 396 kg of a 31% solution of Primid XL-552 in water.

Analysis of the final binder showed the following data

Solids content: 18.9% pH: 10.2

Viscosity: 25.5 mPas·s

Density: 1.066 kg/l

A mineral fiber product according to the invention was prepared with 100 mm mineral wool bonded and the binder composition obtained to obtain a cured binder composition based on oxidized lignin. A common method for producing the mineral fibre product as described in the description above is used. The density of the mineral fiber product was 145 kg/m$^3$. The ignition loss was 2.3%. The proportion of the cured binder composition in the mineral fiber product was 2.2%. The binder composition used was as described above including 0.1% mineral oil.

The mineral fibre product prepared was tested as described in the Protocol I. The results are given in the Table A below.

Example 2

3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour is a check made on insolubilized lignin. This can be made by checking the solution on a glass plate or a Hegman gauge. Insolubilized lignin is seen as small particles in the brown binder. During the dissolution step will the lignin solution change color from brown to shiny black.

After the lignin is completely dissolved, 1 liter of a foam dampening agent (Skumdæmper 11-10 from NCÅ-Verodan) is added. Temperature of the batch is maintained at 40° C.

Then addition of 307.5 kg 35% hydrogen peroxide is started. The hydrogen peroxide is dosed at a rate of 200-300 liter/hour. First half of the hydrogen peroxide is added at a rate of 200 l/h where after the dosage rate is increased to 300 liter/hour.

During the addition of hydrogen peroxide is the temperature in the reaction mixture controlled by heating or cooling in such a way that a final reaction temperature of 65° C. is reached.

After 15 min reaction at 65° C. is the reaction mixture cooled to a temperature below 50° C. Hereby is a resin obtained having a COOH value of 1.2 mmol/g solids.

Final Binder Preparation

From the above mentioned AOL resin a binder was formulated by addition of 270 kg polyethylene glycol 200 and 433 kg of a 31% solution of Primid XL-552 in water.

Analysis of the final binder showed the following data

Solids content: 18.9% pH: 9.7

Viscosity: 25.5 mPas·s

Density: 1.066 kg/l

This binder composition was used with 100 mm mineral wool to produce a mineral wool product with a density of 145 kg/$m^3$, thickness of 100 mm and a loss of ignition of 2.4%. A common method for producing the mineral fibre product as described in the description above is used. This material was used as described in the Protocol I. The results are given in the Table A below.

Thermal Emissions of Examples 1 to 2 and Comparative Examples 1 and 2

The mineral fibre products of Examples 1 and 2 and Comparative Examples 1 and 2 were tested with respect to their emission characteristics for isocyanic acid (ICA), $NH_3$, HCN at temperatures of 250° C., 350° C., 450° C. and 600° C., respectively, according to the Protocol I described above.

The results are shown in in the following Table A. The output values given are averaged emissions of the individual species in ppm per gram solid content per second (ppm/g solids·s).

TABLE A

| Temperature | Example | Averaged elapsed time (seconds) | $NH_3$ (ppm/g solids · s) | ICA (ppm/g solids · s) | HCN (ppm/g solids · s) |
|---|---|---|---|---|---|
| 250° C. | Comp. Ex. 1 | 2163 | 114 | 125 | 30 |
| 350° C. | Comp. Ex. 1 | 589 | 1110 | 2505 | 308 |
| 450° C. | Comp. Ex. 1 | 247 | 2970 | 7305 | 1822 |
| 600° C. | Comp. Ex. 1 | 171 | 5754 | 10456 | 2199 |
| 250° C. | Comp. Ex. 2 | 939 | 0 | 11 | 0 |
| 350° C. | Comp. Ex. 2 | 572 | 61 | 531 | 96 |
| 450° C. | Comp. Ex. 2 | 981 | 132 | 432 | 666 |

TABLE A-continued

| Temperature | Example | Averaged elapsed time (seconds) | $NH_3$ (ppm/g solids · s) | ICA (ppm/g solids · s) | HCN (ppm/g solids · s) |
|---|---|---|---|---|---|
| 600° C. | Comp. Ex. 2 | 194 | 683 | 1579 | 1593 |
| 250° C. | Example 1 | 474 | 18 | 0 | 0 |
| 350° C. | Example 1 | 699 | 18 | 151 | 64 |
| 450° C. | Example 1 | 422 | 137 | 269 | 670 |
| 600° C. | Example 1 | 164 | 993 | 487 | 811 |
| 250° C. | Example 2 | 508 | 32 | 0 | 1 |
| 350° C. | Example 2 | 752 | 14 | 119 | 77 |
| 450° C. | Example 2 | 509 | 137 | 227 | 575 |
| 600° C. | Example 2 | 156 | 954 | 450 | 819 |

Emission rates for the 4 tested mineral wool products have been obtained, enabling us to rank the emission rates from the systems relative to each other.

In general, the emissions rates from Comparative Example 1 are significantly higher than from Comparative Example 2 and Examples 1 and 2. Example 1 and Example 2 have more or less identical emission rates for all species at all temperatures independent of the chemical composition of the binder used in these mineral wool products.

From the results it can be seen that Comparative Example 1 displays the highest level of the emitted species (ICA, $NH_3$ and HCN). Comparative Example 1 emits the highest amount of ICA. ICA emissions rates are higher in Comparative Example 2 than Examples 1 and 2. Example 1 and 2 have more or less identical emission rates at all temperatures.

With respect to ammonia, comparative example 1 displays the highest level of emitted $NH_3$. $NH_3$ emissions rates are comparable for Comparative Example 2 and Examples 1 and 2

HCN emission rates are increasingly (by increasing temperature) higher in Comparative Example 1 and comparative Example 2 than Examples 2 and 3. Again comparative example 1 displays the highest level of emitted gases.

Maximum Service Temperature Test of Example 1 and Comparative Example 1

The properties of the products of Example 1 and Comparative Example 1 were tested according to the following test method: Maximum Service Temperature plate test; EN 14706: 2012 to demonstrate thermal stability at high temperatures in mineral wool products. Both products have been tested more than once.

The measurements and test results for the product of Example 1 were as follows:

| Test # | Density kg/$m^3$ | Temp. ST(+) ° C. | Height d 0 mm | Δ Thickness d 2 % | Δ Thickness d 3 % | Δ Length 299 mm % | Temp. at mid-height ° C. |
|---|---|---|---|---|---|---|---|
| 1 | 141.7 | 650 | 97.5 | 1.0 | 0.1 | 0 | 573 |
| 2 | 145.4 | 650 | 98.0 | 0.0 | 0.1 | 0 | 650 |
| 3 | 144.1 | 650 | 97.8 | 0.3 | 0.5 | 0 | 628 |
| 4 | 145.5 | 650 | 97.9 | 0.8 | 0.1 | 0 | 594 |
| 5 | 140.3 | 650 | 97.7 | 0.2 | 0.1 | 0 | 618 |
| 6 | 147.4 | 650 | 97.9 | 0.1 | 0.1 | 0 | 615 |
| Average | 144.1 | 650 | 97.8 | 0.4 | 0.2 | 0 | |
| Avg./rounded | | | | 0 | | 0 | |
| Maximum | | 650 | | | | | 650 |
| Declaration | | 650 | | ≤5 | | ≤5 | ≤650 |

Accordingly, the Maximum Service Temperature value for Example 1 was measured to be ST(+) = 650° C. ± 10° C. The value is in compliance at the chosen test temperature of ST(+) = 650° C., but at the upper limit for exothermic reaction.

The measurements and test results for the product of Comparative Example 1 were as follows:

| Test # | Density kg/m$^3$ | Temp. ST(+) ° C. | Height d 0 mm | Δ Thickness d 2 % | Δ Thickness d 3 % | Δ Length 299 mm % | Temp. at mid-height ° C. |
|---|---|---|---|---|---|---|---|
| 1 | 142.6 | 650 | 96.1 | 0.1 | 0.2 | 0 | 632 |
| 2 | 144.3 | 650 | 96.2 | 0.5 | 0.4 | 0 | 631 |
| 3 | 145.2 | 650 | 97.5 | 0.7 | 0.8 | 0 | 668 |
| 4 | 143.1 | 650 | 95.7 | 0.5 | 0.7 | 0 | 665 |
| 5 | 147.0 | 650 | 96.4 | 0.0 | 0.5 | 0 | 632 |
| 6 | 148.4 | 650 | 96.9 | 0.0 | 0.4 | 0 | 594 |
| Average | 144.8 | 650 | 96.5 | 0.3 | 0.5 | 0 | |
| Avg./rounded | | | | 0 | | 0 | |
| Maximum | | 650 | | | | | 668 |
| Declaration | | 650 | | ≤5 | | ≤5 | ≤650 |

Accordingly, the Maximum Service Temperature value was measured to be ST(+) = 650° C. ± 10° C. The value is not in compliance at the chosen test temperature of ST(+) = 650° C., since the upper limit for exothermic reaction has been reached.

The product of Example 1 is in compliance with the requirements for the Maximum Service Temperature plate test; EN 14706: 2012, regarding the exothermic reaction during the test. The product of Comparative Example 1 is not in compliance with the criteria for exothermic reaction during the test, since the temperature at mid-height of the test specimen raised above the temperature setpoint, during the test. All other test criteria for passing the Maximum Service Temperature plate test; EN 14706: 2012 were fulfilled by both products.

Experimental Part Directed to Alternative B

EXAMPLES

In the following examples, several mineral wool products containing binders which fall under the definition of the present invention were prepared and compared to mineral wool products containing binders according to the prior art.

Indications of percentage (%) refer to percent by weight, unless otherwise stated.

The following properties were determined for the mineral wool products containing binders according to the present invention and the mineral wool products containing binders according to the prior art, respectively:

Determination of Isocyanic Acid (ICA) Emission

The total amount of ICA off-gassed from the mineral fibre product containing the cured binder composition can be measured according to the following Protocol II. The same Protocol II can be used to analyse the total amount of HCN emitted.

Protocol II

Samples of mineral wool products have been analysed by thermal tests. The thermal test system consists of a temperature adjustable tube furnace provided with a quartz glass tube, connected to the GASMET DX4000 FTIR (fourier-transform infrared spectroscopy) analyzer via heat traced transport tubes. The tube in the tube furnace is a quartz tube (diameter 23 mm, length: 800 mm, thickness 2.0 mm) with conical female glass joints in both ends: NS 24/29. The tube furnace used is from Nabertherm, model R30/500/12-B170.

The GASMET analyzer is equipped with an internal pump that supplies the required amount of gas to perform a proper analysis of the gas. The quartz glass tube is open to the surroundings to secure proper amounts of carrier gas to the analyzer along with the emitted gases from the test specimen.

The mineral wool products were homogenized by crushing. Approximately 2 g sample was weighed and distributed evenly in a porcelain crucible and loaded in the quartz tube at pre-adjusted temperatures. The current test temperature at the sample was monitored by a thermocouple. During the whole test, air is passed through the tube at a rate of 3 L/min at 25° C.

The system was tested for leaks, and cleanliness of the quartz tube prior to any test run by analyzing the air passing through the system. The cleanliness was only accepted if the tested gases were 0 ppm. Values above 0 ppm triggered cleaning of the quartz tube.

All sample points were repeated thrice to ensure high reliability of the measured values.

Upon sample loading, the GASMET data sampling was initiated. The sampling frequency was adjusted to 30 seconds, followed by approximately 2 seconds of processing, resulting in an average duration of each sample point of 32 seconds.

The accuracy of the GASMET is 8 $cm^{-1}$.

The samples were monitored during data collection to observe the burn-out time of all emitted species. Data collection was stopped when the response from all species had declined to zero, or to a stable near-zero level. The samples collected at 250° C. and 350° C. were stopped after approximately one hour had passed, whereas the samples collected at 450° C. and 600° C. was burnt out to near-zero values faster, sometimes only in a few minutes.

Spectra were analysed by use of Calcmet Software, and the system has been calibrated to the respective species beforehand.

Emissions from each sample was treated individually by measuring the exact elapsed time from the species starts to emit until it declines to zero, or near-zero. The integration below the curve is performed by summarizing the individually measured contributions (approximating a numerical integration).

The total emission is calculated by taking sample weight, the molar volume at 0° C., 1 atm, applied gas flow and the molecular weight of the emitted species into consideration. The result is given in the unit "microgram per gram sample".

EXAMPLE

Sample product at 250° C., ICA emission: The average emitted amount of ICA from a 1,501 g sample is 2.35 ppm during a period of 34 minutes, recorded in a flow of 3 liters/minute. This yields: 2.35 ppm ICA·43.03 g/mol/22.4 liter·34 minutes·3 liters/minute/1,501 g=306 μg/g sample Determination of Solid Content (Loss of Ignition (LOI))

The quantity of organic material (loss of ignition) is determined as the loss of weight of the specimen obtained by burning away of organic material measured at 590° C. Normally, the organic material is binder and impregnating oil. This is done as specified in EN 13820. The binder content is taken as the LOT. The binder includes oil and other binder additives, if present.

Determination of Maximum Service Temperature

The Maximum Service Temperature of mineral fiber products were determined according to the Maximum Service Temperature plate test of standard EN 14706:2012.

Determination of Binder Solids

The content of binder after curing is termed "binder solids".

Disc-shaped stone wool samples (diameter: 5 cm; height 1 cm) were cut out of stone wool and heat-treated at 580° C. for at least 30 minutes to remove all organics. The solids of the binder mixture was measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the binder solids was calculated as an average of the two results.

Unless stated otherwise, the following reagents were used as received:

Lignin UPM BioPiva 100: Kraft lignin supplied by UPM as BioPiva100™ as dry powder.

PEG 200: supplied by Sigma-Aldrich and assumed anhydrous for simplicity and used as such.

Primid XL552: hydroxyalkylamide crosslinker supplied by EMS-CHEMIE AG

Momentive VS142: Silquest® VS-142 is an aqueous oligomeric aminosiane supplied by Momentive Preparation of Ammonia Oxidized Lignin (AOL) Resin 3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown binder. During the dissolution step will the lignin solution change color from brown to shiny black.

After the lignin is completely dissolved, 1 liter of a foam dampening agent (Skumdæmper 11-10 from NCÅ-Verodan) is added. Temperature of the batch is maintained at 40° C.

Then addition of 307.5 kg 35% hydrogen peroxide is started. The hydrogen peroxide is dosed at a rate of 200-300 liter/hour. First half of the hydrogen peroxide is added at a rate of 200 l/h where after the dosage rate is increased to 300 liter/hour.

During the addition of hydrogen peroxide the temperature in the reaction mixture is controlled by heating or cooling in such a way that a final reaction temperature of 65° C. is reached.

After 15 min reaction at 65° C. is the reaction mixture cooled to a temperature below 50° C. Hereby is a resin obtained having a COOH value of 1.2 mmol/g solids.

Final Binder Preparation (Uncured Binder Composition Suitable for Preparing the Mineral Fiber Product of the Invention)

From the above mentioned AOL resin a binder was formulated by addition of 270 kg polyethylene glycol 200 (PEG 200) and 433 kg of a 31% solution of Primid XL-552 in water.

Analysis of the final binder showed the following data

Solids content: 18.9% pH: 9.7

Viscosity: 25.5 mPas·s

Density: 1.066 kg/l

Comparative Example 3

This binder is a phenol-formaldehyde resin modified with urea, a PUF-resol. A phenol-formaldehyde resin is prepared by reacting 37% aq. formaldehyde (606 kg) and phenol (189 kg) in the presence of 46% aq. potassium hydroxide (25.5 kg) at a reaction temperature of 84° C. preceded by a heating rate of approximately 1° C. per minute. The reaction is continued at 84° C. until the acid tolerance of the resin is 4 and most of the phenol is converted. Urea (241 kg) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

AT=(Used titration volume (mL))/(Sample volume (mL))

Using the urea-modified phenol-formaldehyde resin obtained, a binder is made by addition of 25% aq. ammonia (90 L) and ammonium sulfate (13.2 kg) followed by water (1300 kg).

To the above mix is added 18% Dextrose (127.5 kg) based upon the dry matter of the above binder and the dextrose.

The binder solids were then measured as described above and the mixture was diluted with the required amount of water and silane for mechanical measurements.

Mineral fiber products in form of pipe section elements were prepared with a thickness of 40 mm (inner diameter 219 mm), a density of 100 kg/$m^3$ and LOI at 3.1%. A common method for producing the mineral fibre product as described in the description above is used.

The mineral fibre product prepared was tested as described in the Protocol II. The results are given in the Table B below.

Comparative Example 4

This binder is a phenol-formaldehyde resin modified with urea, a PUF-resol. A phenol-formaldehyde resin is prepared by reacting 37% aq. formaldehyde (606 kg) and phenol (189 kg) in the presence of 46% aq. potassium hydroxide (25.5 kg) at a reaction temperature of 84° C. preceded by a heating rate of approximately 1° C. per minute. The reaction is continued at 84° C. until the acid tolerance of the resin is 4 and most of the phenol is converted. Urea (241 kg) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

AT=(Used titration volume (mL))/(Sample volume (mL))

Using the urea-modified phenol-formaldehyde resin obtained, a binder is made by addition of 25% aq. ammonia (90 L) and ammonium sulfate (13.2 kg) followed by water (1300 kg).

To the above mix is added 18% Dextrose (127.5 kg) based upon the dry matter of the above binder and the dextrose.

The binder solids were then measured as described above and the mixture was diluted with the required amount of water and silane for mechanical measurements.

Mineral fiber products in form of a wired mat were prepared with a thickness of 100 mm, a density of 100 kg/$m^3$ and LOI at 0.3%. A common method for producing the mineral fibre product as described in the description above is used.

The mineral fibre product prepared was tested as described in the Protocol II. The results are given in the Table B below.

Example 3

3267 kg of water is charged in 6000 l reactor followed by 861 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour is a check made on insolubilized lignin. This can be made by checking the solution on a glass plate or a Hegman gauge. Insolubilized lignin is seen as small particles in the brown binder. During the dissolution step will the lignin solution change color from brown to shiny black. After the lignin is completely dissolved, 1 liter of a foam dampening agent (Skumdæmper 11-10 from NCÅ-Verodan) is added. Temperature of the batch is maintained at 40° C.

Then addition of 307.5 kg 35% hydrogen peroxide is started. The hydrogen peroxide is dosed at a rate of 200-300 liter/hour. First half of the hydrogen peroxide is added at a rate of 200 l/h where after the dosage rate is increased to 300 liter/hour.

During the addition of hydrogen peroxide is the temperature in the reaction mixture controlled by heating or cooling in such a way that a final reaction temperature of 65° C. is reached.

After 15 min reaction at 65° C. is the reaction mixture cooled to a temperature below 50° C. Hereby is a resin obtained having a COOH value of 1.1 mmol/g solids.

Final Binder Preparation

From the above mentioned AOL resin a binder was formulated by addition of 270 kg polyethylene glycol 200 and 396 kg of a 31% solution of Primid XL-552 in water.

Analysis of the final binder showed the following data

Solids content: 18.9% pH: 10.2

Viscosity: 25.5 mPas·s

Density: 1.066 kg/l

Mineral fiber products in form of a wired mat were prepared with a thickness of 80 mm, a density of 100 kg/$m^3$ and LOI at 0.3%. A common method for producing the mineral fibre product as described in the description above is used.

The mineral fibre product prepared was tested as described in the Protocol II. The results are given in the Table B below.

Thermal Emissions of Example 3 and Comparative Examples 3 to 4

The mineral fibre products of Example 3 and Comparative Examples 3 to 4 were tested with respect to their emission characteristics for isocyanic acid (ICA) and HCN at temperatures of 250° C., 350° C., 450° C. and 600° C., respectively, according to the Protocol II described above.

The results are shown in in the following Table B. The output values given are averaged values of the emissions of the individual species in µg per gram of sample (µg/g sample).

TABLE B

| Temperature | Example | ICA (µg/g sample) | HCN (µg/g sample) |
|---|---|---|---|
| 250° C. | Comp. Ex. 3 | 977 | 135 |
| 350° C. | Comp. Ex. 3 | 2139 | 575 |
| 450° C. | Comp. Ex. 3 | 2751 | 972 |
| 600° C. | Comp. Ex. 3 | 1175 | 396 |
| 250° C. | Comp. Ex. 4 | 306 | 13 |
| 350° C. | Comp. Ex. 4 | 542 | 106 |
| 450° C. | Comp. Ex. 4 | 420 | 85 |
| 600° C. | Comp. Ex. 4 | 331 | 61 |
| 250° C. | Example 3 | 0 | 3 |
| 350° C. | Example 3 | 35 | 39 |
| 450° C. | Example 3 | 32 | 43 |
| 600° C. | Example 3 | 39 | 23 |

Emission amounts for the 3 tested mineral wool products have been obtained, enabling us to rank the total emissions from the systems relative to each other.

In general, the total emissions from Comparative Example 3 are significantly higher than from Comparative Example 4 and in particular than from Example 3.

From the results it can be seen that Comparative Example 3 by far displays the highest level of the emitted species (ICA and HCN) which is to be seen in respect of the comparably high LOI content of the tested product.

Total ICA and HCN emissions are still higher in Comparative Example 4 than Examples 3 even though the LOI content is similar for both.

Maximum Service Temperature Test of Example 3

The properties of the product of Example 3 was tested according to the following test method: Maximum Service Temperature plate test; EN 14706: 2012 to demonstrate thermal stability at high temperatures in mineral wool products. The product has been tested more than once.

The Maximum Service Temperature value for Example 3 was measured to be ST(+)=660° C.±10° C. The value is in compliance at the chosen test temperature of ST(+)=660° C.

The invention claimed is:

1. A mineral fiber product, wherein the product is in the form of a preformed pipe section and comprises mineral fibers bound by a cured binder composition, a non-cured binder composition comprising one or more oxidized lignins, and wherein heating the mineral fiber product containing the cured binder composition to a temperature of 600° C. results in an emission of less than 1500 ppm isocyanic acid (ICA) per gram solids content per second and/or less than 1000 pg ICA per gram of sample, and wherein the mineral fiber product satisfies conditions for a Maximum Service Temperature of at least 600° C., according to the Maximum Service Temperature plate test of EN 14706:2012.

2. The mineral fiber product of claim 1, wherein heating the mineral fiber product containing the cured binder composition to a temperature of 600° C. results in an emission of less than 1000 ppm ICA per gram solids content per second.

3. The mineral fiber product of claim 1, wherein heating the mineral fiber product containing the cured binder composition to a temperature of 600° C. results in an emission of less than 750 μg ICA per gram of sample.

4. The mineral fiber product of claim 1, wherein the mineral fiber product is a thermal insulation product.

5. The mineral fiber product of claim 1, wherein the mineral fiber product has a thickness of from 20 mm to 500 mm.

6. The mineral fiber product of claim 1, wherein heating the mineral fiber product to a temperature of 600° C. results in an emission of less than 2500 ppm $NH_3$ per gram solids content per second.

7. The mineral fiber product of claim 1, wherein heating the mineral fiber product to a temperature of 600° C. results in an emission of less than 2000 ppm HCN per gram solids content per second and/or an emission of less than 500 μg HCN per gram of sample.

8. The mineral fiber product of claim 1, wherein the non-cured binder composition comprises:

a component (i) in the form of one or more oxidized lignins;

a component (ii) in the form of one or more cross-linkers;

optionally, a component (iii) in the form of one or more plasticizers.

9. The mineral fiber product of claim 1, wherein the one or more oxidized lignins comprise one or more of Kraft lignins, soda lignins, lignosulfonate lignins, organosolv lignins, lignins from biorefining processess of lignocellulosic feedstocks, or any mixture thereof.

10. The mineral fiber product of claim 1, wherein the one or more oxidized lignins comprise one or more ammonia-oxidized lignins (AOL's).

11. The mineral fiber product of claim 1, wherein the one or more oxidized lignins have a carboxylic acid group content of from 0.05 mmol/g to 10 mmol/g, based on a dry weight of the one or more oxidized lignins.

12. The mineral fiber product of claim 1, wherein component (ii) is in the form of one or more cross-linkers selected from a) β-hydroxyalkylamide cross-linkers and/or oxazoline-cross-linkers; and/or b) multifunctional organic amines; and/or c) an epoxidized oil based on fatty acid triglyceride or one or more flexible oligomers or polymers which contain reactive functional groups; and/or d) a molecule having 3 or more epoxy groups; and/or e) one or more cross-linkers selected from polyethylene imine, polyvinyl amine, fatty amines; and/or f) one more cross-linkers in the form of fatty amides; and/or g) one or more cross-linkers selected from dimethoxyethanal, glycolaldehyde, glyoxalic acid; and/or h) one or more cross-linkers selected from polyester polyols; and/or i) one or more cross-linkers selected from starch, modified starch, carboxymethylcellulose (CMC); and/or j) one or more cross-linkers in the form of aliphatic multifunctional carbodiimides; and/or k) one or more cross-linkers selected from melamine based cross-linkers.

13. The mineral fiber product of claim 1, wherein component (iii) is comprised in the non-cured binder composition in the form of one or more plasticizers selected from polyethylene glycols, polyethylene glycol ethers, polyethers, hydrogenated sugars, phthalates and/or acids, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups; and/or one or more plasticizers selected from fatty alcohols, monohydroxy alcohols; and/or one or more plasticizers selected from alkoxylates; and/or one or more plasticizers in the form of propylene glycols; and/or one or more plasticizers in the form of glycol esters; and/or one or more plasticizers selected from adipates, acetates, benzoates, cyclobenzoates, citrates, stearates, sorbates, sebacates, azelates, butyrates, valerates; and/or one or more plasticizers selected from phenol derivatives; and/or one or more plasticizers selected from silanols, siloxanes; and/or one or more plasticizers selected from sulfates, sulfonates, phosphates; and/or one or more plasticizers in the form of hydroxy acids; and/or one or more plasticizers selected from monomeric amides; and/or one or more plasticizers selected from quaternary ammonium compounds; and/or one or more plasticizers selected from vegetable oils; and/or tall oil; and/or one or more plasticizers selected from hydrogenated oils, acetylated oils; and/or one or more plasticizers selected from acid methyl esters; and/or one or more plasticizers selected from alkyl polyglucosides, gluconamides, aminoglucoseamides, sucrose esters, sorbitan esters; and/or one or more plasticizers selected from polyethylene glycols, polyethylene glycol ethers.

14. The mineral fiber product of claim 1, wherein the mineral fiber product has a loss on ignition (LOI) of from 0.25% to 6.0%.

15. A method for transporting a medium, wherein the method comprises a) covering a pipe with a mineral fiber product as a thermal pipe insulation, and b) transporting the medium through the pipe, the mineral fiber product being the mineral fiber product of claim 1.

16. The method of claim 15, wherein a gas, steam or a fluid is transported in the pipe.

17. A pipe in contact with the mineral fiber product of claim 1 as thermal insulation.

18. The pipe of claim 17, wherein the pipe is a metal pipe.

19. The mineral fiber product of claim 1, wherein the one or more oxidized lignins have a carboxylic acid group content of from 0.45 mmol/g to 5 mmol/g, based on a dry weight of the one or more oxidized lignins.

* * * * *